(12) United States Patent
Lakes et al.

(10) Patent No.: US 10,177,967 B2
(45) Date of Patent: Jan. 8, 2019

(54) REDIRECTION SERVICE RESOURCE LOCATOR MECHANISM

(71) Applicants: Jesse Lakes, Seattle, WA (US); Jesse Pasichnyk, Seattle, WA (US)

(72) Inventors: Jesse Lakes, Seattle, WA (US); Jesse Pasichnyk, Seattle, WA (US)

(*) Notice: Subject to any disclaimer, the term of this patent is extended or adjusted under 35 U.S.C. 154(b) by 0 days.

(21) Appl. No.: 14/215,072

(22) Filed: Mar. 17, 2014

(65) Prior Publication Data

US 2014/0280919 A1 Sep. 18, 2014

Related U.S. Application Data

(60) Provisional application No. 61/793,599, filed on Mar. 15, 2013.

(51) Int. Cl.
| | |
|---|---|
| G06F 15/173 | (2006.01) |
| H04L 12/24 | (2006.01) |
| H04L 29/08 | (2006.01) |
| G06Q 30/06 | (2012.01) |

(52) U.S. Cl.
CPC ..... H04L 41/0672 (2013.01); G06Q 30/0601 (2013.01); H04L 67/02 (2013.01); H04L 67/2804 (2013.01); H04L 67/2814 (2013.01)

(58) Field of Classification Search
CPC ..... H04L 67/2814; H04L 45/28; H04L 45/22; H04L 67/02; H04L 67/327; G06F 17/30887; G06F 17/30876; G06F 17/30067; G06F 17/30902; G06F 17/3088; G06F 17/30882

USPC .......... 725/36; 709/203–204, 213, 217–219, 709/223–224, 238–239

See application file for complete search history.

(56) References Cited

U.S. PATENT DOCUMENTS

| | | | | |
|---|---|---|---|---|
| 6,085,242 | A * | 7/2000 | Chandra | G06F 17/30887 707/E17.115 |
| 2002/0016765 | A1 * | 2/2002 | Sacks | G06Q 20/02 705/39 |
| 2002/0198939 | A1 * | 12/2002 | Lee | H04L 29/06 709/203 |
| 2007/0124414 | A1 * | 5/2007 | Bedingfield, Sr. | G06F 17/30887 709/217 |
| 2007/0124500 | A1 * | 5/2007 | Bedingfield, Sr. | G06F 17/30887 709/245 |
| 2008/0027809 | A1 * | 1/2008 | Storm | G06Q 30/02 705/14.16 |
| 2008/0140542 | A1 * | 6/2008 | Perron | G06Q 20/3224 705/27.1 |
| 2010/0058160 | A1 * | 3/2010 | Navarro | G06Q 10/0637 715/208 |
| 2011/0145435 | A1 * | 6/2011 | Bhatawdekar | G06F 21/566 709/238 |
| 2011/0153587 | A1 * | 6/2011 | Murugan | G06F 17/30887 707/706 |

(Continued)

Primary Examiner — Farid Homayounmehr
(74) Attorney, Agent, or Firm — Brian J. Pangrle

(57) ABSTRACT

A system can include circuitry that processes a URL for information; circuitry that transmits at least a portion of the information via a network interface; circuitry that receives metadata via the network interface responsive to the transmission of at least a portion of the information; circuitry that associates at least a portion of the metadata with a short URL; and circuitry that transmits the short URL. Various other apparatuses, systems, methods, etc., are also disclosed.

10 Claims, 17 Drawing Sheets

(56) References Cited

U.S. PATENT DOCUMENTS

| | | | |
|---|---|---|---|
| 2011/0270667 A1* | 11/2011 | Kenny | G06O 30/00 |
| | | | 705/14.36 |
| 2011/0289434 A1* | 11/2011 | Kieft | G06F 17/30887 |
| | | | 715/760 |
| 2012/0047577 A1* | 2/2012 | Costinsky | H04L 67/02 |
| | | | 726/22 |
| 2012/0124372 A1* | 5/2012 | Dilley | H04L 67/2819 |
| | | | 713/162 |
| 2012/0259832 A1* | 10/2012 | Walker | G06F 17/30887 |
| | | | 707/709 |
| 2013/0282496 A1* | 10/2013 | Navarro | G06Q 10/0637 |
| | | | 705/14.72 |
| 2014/0122567 A1* | 5/2014 | Suryavanshi | G06F 17/30887 |
| | | | 709/203 |
| 2014/0280677 A1* | 9/2014 | Altman | H04L 67/2847 |
| | | | 709/213 |
| 2014/0301275 A1* | 10/2014 | Chang | H04L 41/0846 |
| | | | 370/328 |
| 2015/0156108 A1* | 6/2015 | Shi | H04L 12/4658 |
| | | | 370/218 |

\* cited by examiner

REDIRECTION SERVICE RESOURCE LOCATOR MECHANISM

RELATED APPLICATIONS

This application claims priority to and the benefit of a U.S. Provisional Patent Application having Ser. No. 61/793,599, filed 15 Mar. 2013, which is incorporated by reference herein.

TECHNICAL FIELD

Subject matter disclosed herein generally relates to technologies and techniques for redirecting services.

BACKGROUND

Redirection services are provided by, for example, the HTTP protocol, which finds use with the Internet and the World Wide Web (e.g., interlinked hypertext documents accessible via the Internet).

For the Internet, resources (e.g., information, programs, etc.) are located using uniform resource locators or universal resource locator (URLs), a type of uniform resource identifier (URI). A URL includes, for example: a scheme name (e.g., HTTP), followed by a colon, two slashes, then, depending on scheme, a domain name (e.g., alternatively, an IP address), a port number, a path of a resource to be fetched or a program to be run, then, for example, for programs such as Common Gateway Interface (CGI) scripts, a query string, key-value string, etc., and an optional fragment identifier.

As to redirecting, using HTTP as an example, a redirect is a response with a status code beginning with 3 that induces a browser to go to another location, with annotation describing the reason, which allows for the correct subsequent action (such as changing links in the case of code 301, a permanent change of address). HTTP defines several status codes for redirection, including: 300 multiple choices (e.g., to offer different languages); 301 moved permanently; 302 found (e.g., optionally to specify redirection for a particular reason, which may be unspecified); 303 see other (e.g., for results of cgi-scripts); and 307 temporary redirect.

The foregoing status codes operate according to a redirect target in a location header of a HTTP response. Below is an example of an HTTP response that uses the status code 301 "moved permanently" redirect:

```
HTTP/1.1 301 Moved Permanently
Location: http://www.example.org/
Content-Type: text/html
Content-Length: 174
<html>
<head>
<title>Moved</title>
</head>
<body>
<h1>Moved</h1>
<p>This page has moved to <a
href="http://www.example.org/">http://www.example.org/</a>.</p>
</body>
</html>
```

A redirection service may be part of an information management system that provides an Internet link that redirects users to desired content. A redirect link may be used as a permanent address, for example, as to content that frequently changes hosts. As an example, the redirection service "bit.ly" shortens URLs through use of the bit.ly domain or other custom domains to generate shortened links. Redirection is achieved using an HTTP Redirect (e.g., URL forwarding from the short URL to the full URL).

Another feature specified in the HTTP is known as a "referrer". For example, when a webpage link is clicked by a user, a browser application issues a HTTP request that includes a referrer field that indicates the source of the link (e.g., the last page the user was on—the one where he/she clicked the link). More generally, a referrer is the URL of a previous item which led to the HTTP request being issued. The referrer for an image, for example, is generally the HTML page on which it is to be displayed. The referrer field is an optional part of the HTTP request sent by a browser application to a web server.

On the Internet, various server variables are available, which may be part of a request (e.g., Request.ServerVariables). A request may include one or more parameters that specify information (e.g., server_variable). As an example, a variable "REMOTE_ADDR" may be specified as a parameter for the IP address of a remote host making a request, noting that an IP address can assist in geolocation. As an example, consider a browser application running on a computer with a connection to the Internet and, thus, an IP address. A user, using the browser, can enter a domain name for a webpage such that the browser instructs the computer to send a request to retrieve the webpage. To allow a server hosting the webpage to respond to the request, the request typically includes the IP address of the sending computer (i.e., where the information should be sent).

Depending on configuration, a server may also respond by sending a cookie (e.g., which may be stored by the browser application). A cookie includes some information, which a browser application may instruct a computer to send upon a subsequent request.

While some examples mention "browser" or "browser application", any application that allows for access to the Internet (e.g., using the HTTP) may be configured to make a request. As an example of a type of application, consider the various iTunes apps that may be implemented on an iPhone device such that the iPhone device can send a request. An iTunes or other app may also include an ad (e.g., a banner, etc.) where activating the ad (e.g., clicking, tapping, etc., on a link graphic) causes the device running the app to send a request (e.g., an HTTP request).

With respect to connections to the Internet, a device may include circuitry to connect via wire, wirelessly or both via wire and wirelessly. As to wireless connection, a cellular or other network may be intermediate to the Internet (e.g., 3G, 4G, BLUETOOTH™, etc.).

On the World Wide Web, various entities exist in the realm of e-commerce. In a system known as affiliate marketing, a publisher can be any type of Web site, app, etc., for example, from a well-known destination that offers consumers a range of shopping opportunities to a blogger that's just beginning to attract an audience to an app developer. Regardless of the type, as a loyal following is built, opportunities exist via affiliate marketing to monetize the site, the app, etc. by earning commissions. In such a scheme, the publisher can become an affiliate of an affiliate program where the publisher can displays ads, text links, or product links (e.g., from an advertiser or other entity) in return for a commission when a sale is made or when a lead is acquired. A sale may be tied to a specific action such as filling out a form or downloading a trial.

One affiliate network is LinkShare, which manages various different affiliate programs. LinkShare facilitates relationships between publishers and advertisers by providing the underlying technology that manages links, tracks results and commissions, and sends payments.

An affiliate programs may operate as follows: a site owner (e.g., affiliate) promotes goods or services of a merchant for sale on its site by including an "affiliate link" to direct a user to that merchant for a good, goods, a service, services, etc. When a user (e.g., a visitor) click on the affiliate link, an identification code is associated with the click (e.g., via a cookie) and in the event that the user takes an appropriate action (e.g., a visit, a conversion to a lead, a conversion to a sale) then the affiliate (i.e., the site owner) is paid by the merchant. The merchant or affiliate network will also usually provide tools for the affiliate to monitor various metrics, such as the number of visitors sent to a merchant site, the number of clicks or sales generated, and the earnings accumulated. Affiliate relationships may be established either with each merchant directly (e.g., Amazon.com), or through an established third-party affiliate network (e.g., LinkShare, TradeDoubler, Commission Junction, etc.).

As described herein, in various examples, a redirection service can, for example, enhance user experience on the World Wide Web, optionally with referrer information or affiliate information that may benefit parties involved in transactions for goods, services, etc.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Figure 1:
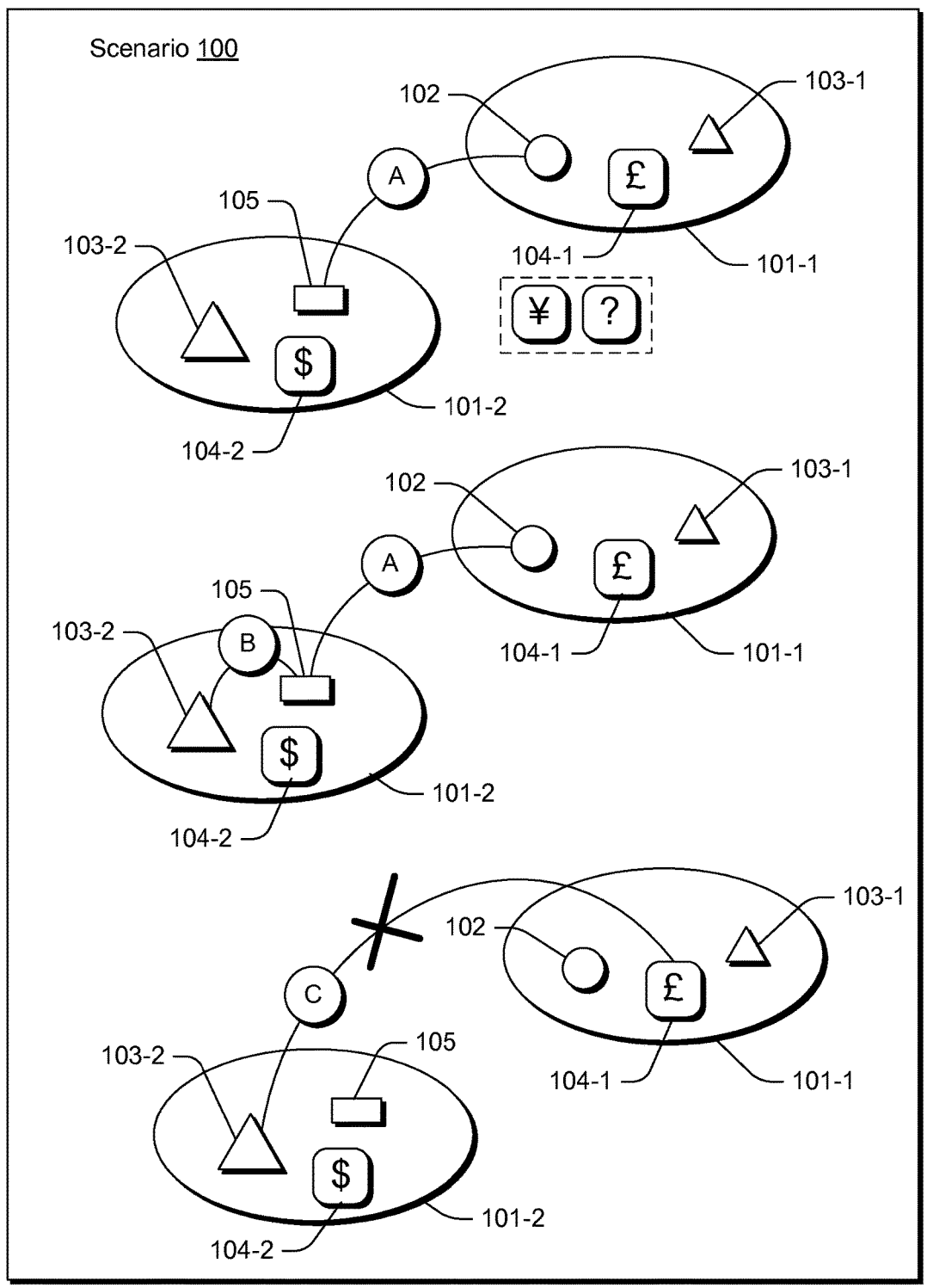
FIG. 1 is an example of a scenario for a user in a first region accessing a site in a second region.

FIG. 1 shows a scenario 100 that includes a first region 101-1 and a second region 101-2 where at least one difference exists between these two regions that may impact a transaction. A difference may exist as to currencies, taxes, intellectual property rights (IPRs), digital rights management (DRM), licensing, etc. In the example of FIG. 1, the difference pertains to currency in that the first region 101-1 uses, primarily, a currency that differs from the primary currency of the second region 101-2.

As to the region 101-1, it includes a user 102 using a browser application to access the Internet, an Internet store front 103-1 (e.g., for transactions involving goods or services) and a financial institution 104-1 (e.g., a bank, a credit union, etc.). The region 101-2 includes a website 105, an Internet store front 103-2 that has a relationship with the Internet store front 103-1 and a financial institution 104-2.

As shown in FIG. 1, the user 102 initiates a communication "A" with respect to the website 105. The communication "A" activates a link of the website 105 that causes issuance of a request "B" for a resource associated with the Internet store front 103-2. For example, the website 105 may be that of a recording artist where the website 105 provides one or more links for purchase of digital media from the Internet store front 103-2.

As shown in FIG. 1, where the user 102 initiates a financial transaction with the Internet store front 103-2 for purchase of a good, a service, etc., the transaction is forbidden because it violates one or more rules. For example, where the user 102 has an account with the financial institution 104-1 in region 101-1, the Internet store front 103-2 may not honor a transaction with that account "C" because it is in a foreign currency.

As mentioned, a reason or reasons for denial of a transaction may be based on a factor or factors other than currency. For example, where the Internet store front 103-2 provides goods, services, etc., based on a regional license that pertains to the region 101-2 only, it may be illegal for the Internet store front 103-2 to sell, provide, transmit, etc., the goods, services, etc., to one or more other regions. As another example, where taxes are to be applied by law, a system may not be in place to collect taxes or deliver tax payments. As yet another example, where the goods, services, etc., are restricted by law (e.g., technology, moral issues, etc.), the transaction may be denied.

Figure 2:
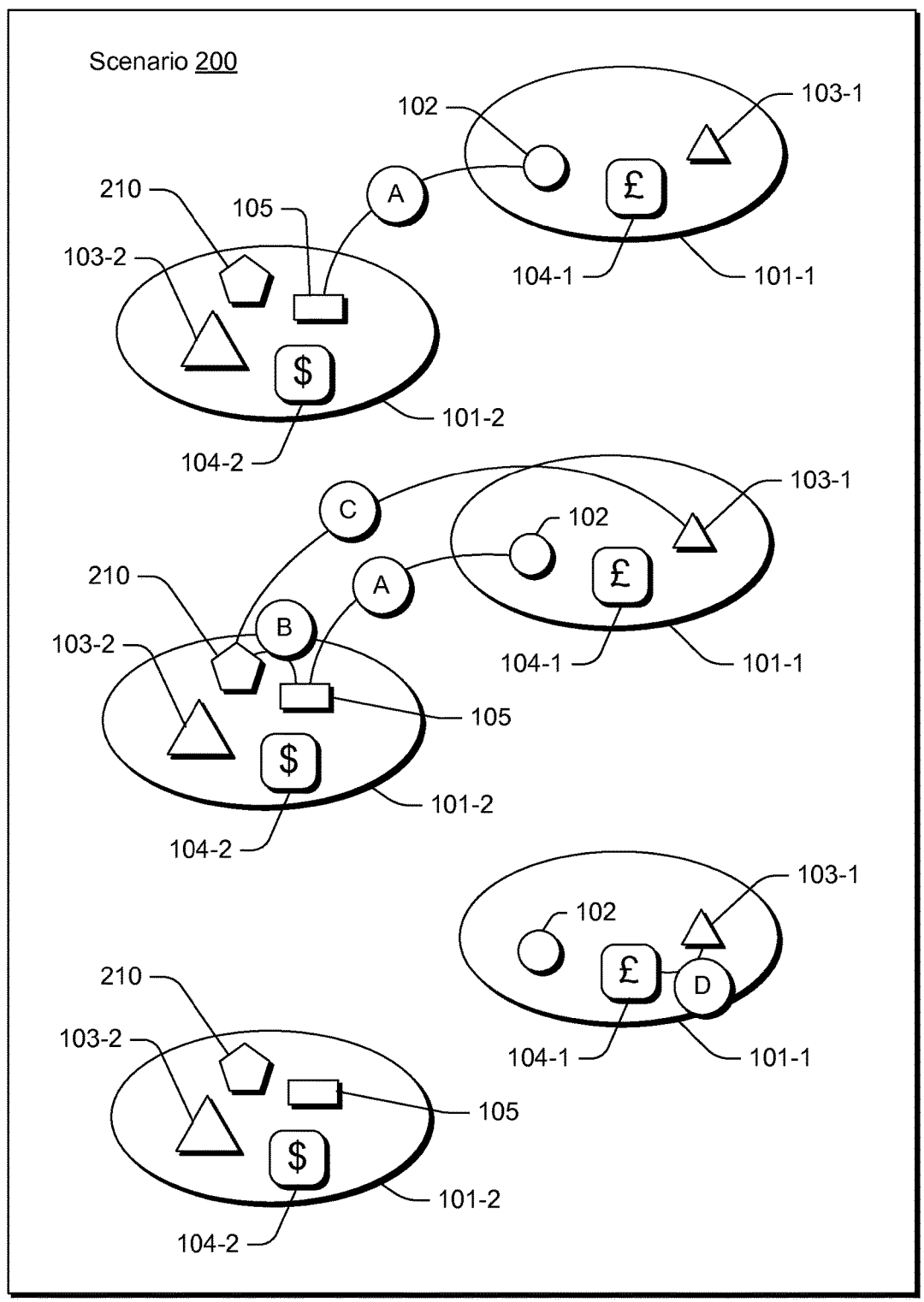
FIG. 2 is an example of a scenario for a user in a first region accessing a site in a second region with redirection.

FIG. 2 shows an example of a scenario 200, which includes the various components, actors, etc., of the scenario 100 and, additionally, a redirection service 210. The redirection service 210 may have a relationship with the website 105 such that a click on a link of the website 105 issues a request to the redirection service 210 rather than the Internet store front 103-2. In the example of FIG. 2, the redirection service 210 analyzes information associated with the communication "A" initiated by the user 102 in the region 101-1 to determine whether the communication "A" is coming from a region other than the region 101-2, which may have one or more conditions, restrictions, etc., with respect to the Internet store front 103-2, the region 101-2, etc. Such an analysis may be a geolocation analysis. For example, Internet geolocation may be performed by associating a geographic location with an IP address (e.g., associated with a machine used by a user). IP address geolocation data can include information such as country, region, city, postal/zip code, latitude, longitude and timezone. Deeper data sets may be available to determine other parameters such as domain name, connection speed, ISP, language, proxies, company name, US DMA/MSA, NAICS codes, and home/business.

In the example scenario 200, the redirection service 210 analyzes information, determines a geolocation of the communication "A" directed to the website 105 and then redirects the request "B" (e.g., activated by the communication "A") to the Internet store front 103-1, which is believed proper for users that reside in region 101-1 (see, e.g., FIG. 25 for an example of a redirect using a protocol such as the HTTP). As shown in FIG. 2, the Internet store front 103-1 can perform a financial transaction with the financial institution 104-1, for example, to complete a purchase by the user 102 for goods, services, etc. available from the Internet store front 103-1 in region 101-1, as advertised on the website 105 in region 101-2.

In various examples described herein, a user, such as the user 102, may operate a device that can access the Internet where the device includes an application (e.g., a web browser or other application) configured to present a user interface that allows the user to activate an Internet link (e.g., via touch, voice, shake, etc.). Where the device is a cell phone (e.g., or other device with cell network circuitry), such a link may occur indirectly (e.g., first via a cell network and then the Internet).

Figure 3:
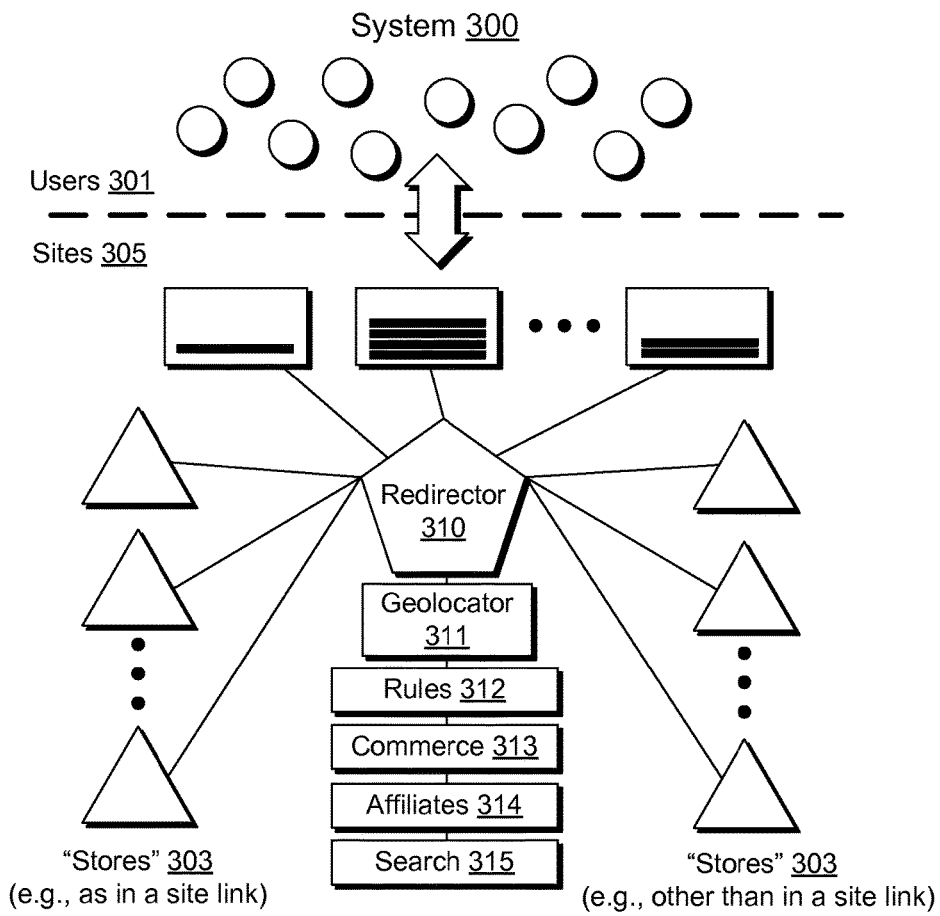
FIG. 3 is an example of a system that includes redirection services.
Figure 3:
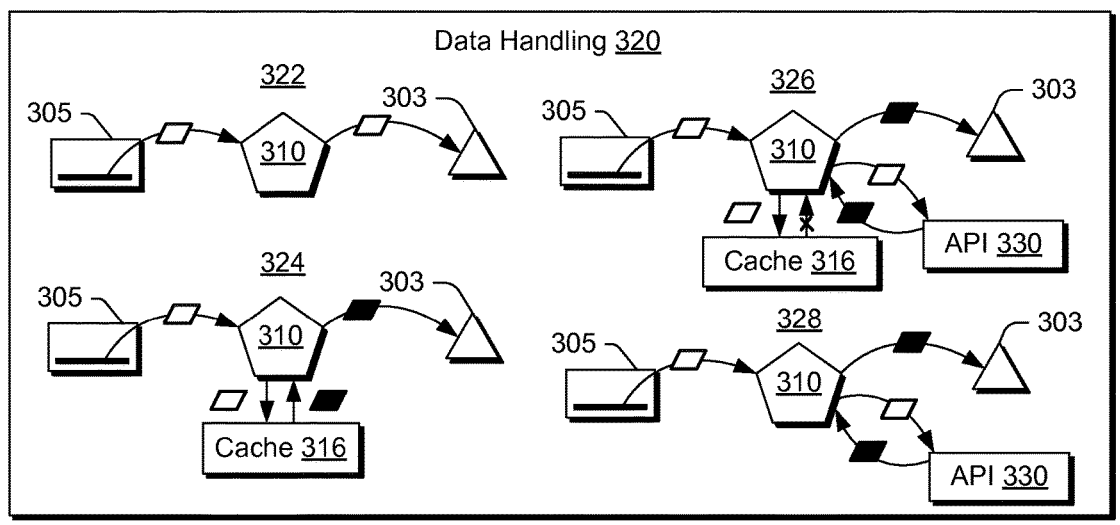

FIG. 3 shows an example system 300 that includes users 301, stores 303, sites 305 and a redirector 310 that provide redirection services to mediate requests issued by the sites 305 in response to links activated by users 301. The redirector 310 may be a server or servers and may be a network of equipment, optionally with equipment located in one or more regions.

In the example of FIG. 3, the redirector 310 includes various modules, which may be software, hardware, etc., provided locally, remotely, locally and remotely. A geolocator module 311 provides for geolocation of, for example, users 301. A rules module 312 provides for one or more rules for a region or regions (e.g., for IPRs, DRM, currencies, taxes, legalities, etc.). A commerce module 313 provides for any of a variety of actions with respect to commerce (e.g., e-commerce), which may include a per click, a per month, etc., type of service agreement. An affiliates module 314 provides for information as to one or more affiliates of, for example, one or more Internet store fronts. A search module 315 provides for search services with respect to information received via one or more sites as being related to a user communication and goods, services, etc., offered by one or more Internet store fronts.

In the example of FIG. 3, the redirector 310 is shown as being configured to service requests from the sites 305 (e.g., as initiated by an application running on a device with a network interface) and to redirect these requests to one or more Internet store fronts 303, which may match or mismatch (e.g., where country of origin matches or does not match).

FIG. 3 also shows various data handling schemes 320 performed by a redirector 310 with respect to information associated with a link in a site 305. As an example, a link of a site 305 may be specified according to the iTunes Store, for example, in the form of a lookup (LU) or a search via the iTunes Store Web Service Search API, which allows for placement of search fields in a link of a website, app, etc., to identify (e.g., lookup) or to search for content within an iTunes Store. For example, it is possible to identify an item using a unique identifier (e.g., an item ID). As another example, it is possible to search for a variety of iTunes Store content using one or more search terms where an item may be an app, an e-books, a movie, a podcast, music, a music video, an audiobook, a TV show, etc. A feature of an API may allow for calling an ID-based lookup request to create mappings between a content library and a digital catalog. Further, as to affiliates, an iTunes Affiliate Program allows affiliates to earn a commission on qualifying revenue generated by clicks initiated from an application (e.g., a web browser application that presents a website, a iPhone application that presents a user interface for activating an Internet link, etc.) into an iTunes Store. As described herein, "search" (e.g., including "searching") can include "lookup" (e.g., including "looking up"); thus, search or searching may include use of an item ID.

To search for content in an iTunes Store, a so-called fully-qualified URL content request can be made to an iTunes Store. In response, the iTunes Store may return a JavaScript Object Notation (JSON) format response. According to the iTunes Store API, a fully-qualified URL has the following format:

http://itunes.apple.com/search?parameterkeyvalue where "parameterkeyvalue" can be one or more parameter key and value pairs indicating the details of a query.

To construct a parameter key and value pair, concatenation is performed for each parameter key (e.g., data field) with an equal sign (=) and a value string. For example: key1=value1. To create a string of parameter key and value pairs via concatenation, an ampersand (&) is used (e.g., key1=value1&key2=value2). The resulting string may be referred to as a data structure.

For the iTunes Store, parameter keys include, as examples: term (e.g., URL-encoded text string to search for in an iTunes Store such as "jack+johnson"); country (e.g., a two-letter country code for an iTunes Store to search, where the default is the store front for the specified country); media (e.g., media type to search for in an iTunes Store such as "movie", where default is all); entity (e.g., type of results to return, relative to the specified media type such as "movieArtist" for a movie media type search, where the default is a track entity associated with the specified media type); attribute (e.g., attribute to search for in an iTunes Store, relative to the specified media type such as "entity=allArtist&attribute=allArtistTerm"); limit (e.g., number of search results to return); lang (e.g., language to use when returning search results such as "en_us"); and explicit (e.g., a flag indicating whether or not to include explicit content in search results).

The iTunes Store API also provides for receipt of lookup requests to search for content based on identifiers, including iTunes IDs and All Music Guide (AMG) IDs. ID-based lookups tend to be performed more quickly and to result in fewer false positive results. As an example, a fully-qualified URL for a specific iTunes Store lookup request by iTunes artist ID is as follows:

http://itunes.apple.com/search?id=909253

For a lookup of the artist Jack Johnson by AMG artist ID, a URL is:

http://itunes.apple.com/lookup?amgArtistId=468749

For multiple artists by their AMG artist IDs, a URL would look like the following:

http://itunes.apple.com/lookup?amgArtistId=468749,
5723
To look up all albums for Jack Johnson, a URL would look like the following:
http://itunes.apple.com/
lookup?id=909253&entity=album
To look up multiple artists by their AMG artist IDs and get each artist's top 5 songs, a URL would look like:
http://itunes.apple.com/lookup?amgArtistId=468749,
5723&entity=album&li mit=5.

In the example of FIG. 3, the data handling schemes 320 include: a scheme 322 where metadata (e.g., an iTunes Store URL or other store directed URL) is received by the redirector 310 and passed to a store front 303 (e.g., as a redirect); a scheme 324 where the metadata is received by the redirector 310 and compared to an information cache 316 where metadata is returned to the redirector 310 and passed to a store front 303 (e.g., as a redirect); a scheme 326 where the metadata is received by the redirector 310 without an adequate response from an information cache 316 and thus submitted via an API 330 which returns metadata that is then passed to a store front 303 (e.g., as a redirect); and a scheme 328 where the metadata is received by the redirector 310 and submitted via an API 330 which returns metadata that is then passed to a store front 303 (e.g., as a redirect).

As an example, a process may include making multiple calls (e.g., to a cache, an API, etc.). Consider a first call that is a lookup to get metadata from a link followed by a second call that is a search that uses the retrieved metadata in an appropriate country.

According to the data handling schemes 320, the redirector 310 can operate to ensure that a redirect directs a user to appropriate content at a store front. As mentioned, in various examples, a redirect may occur according to a protocol such as the HTTP (see, e.g., the HTTP 3XX example of FIG. 25). Thus, in the data handling examples 322, 324, 326 and 328 of FIG. 3 (or other examples), additional lines, arrows may exist, as well as additional entities (e.g., an application that activates a link, one or more entities as occurring or used for Internet communications, etc.). In various examples, a line or lines may represent a logical flow (e.g., without specifics as to a particular protocol).

Figure 4:
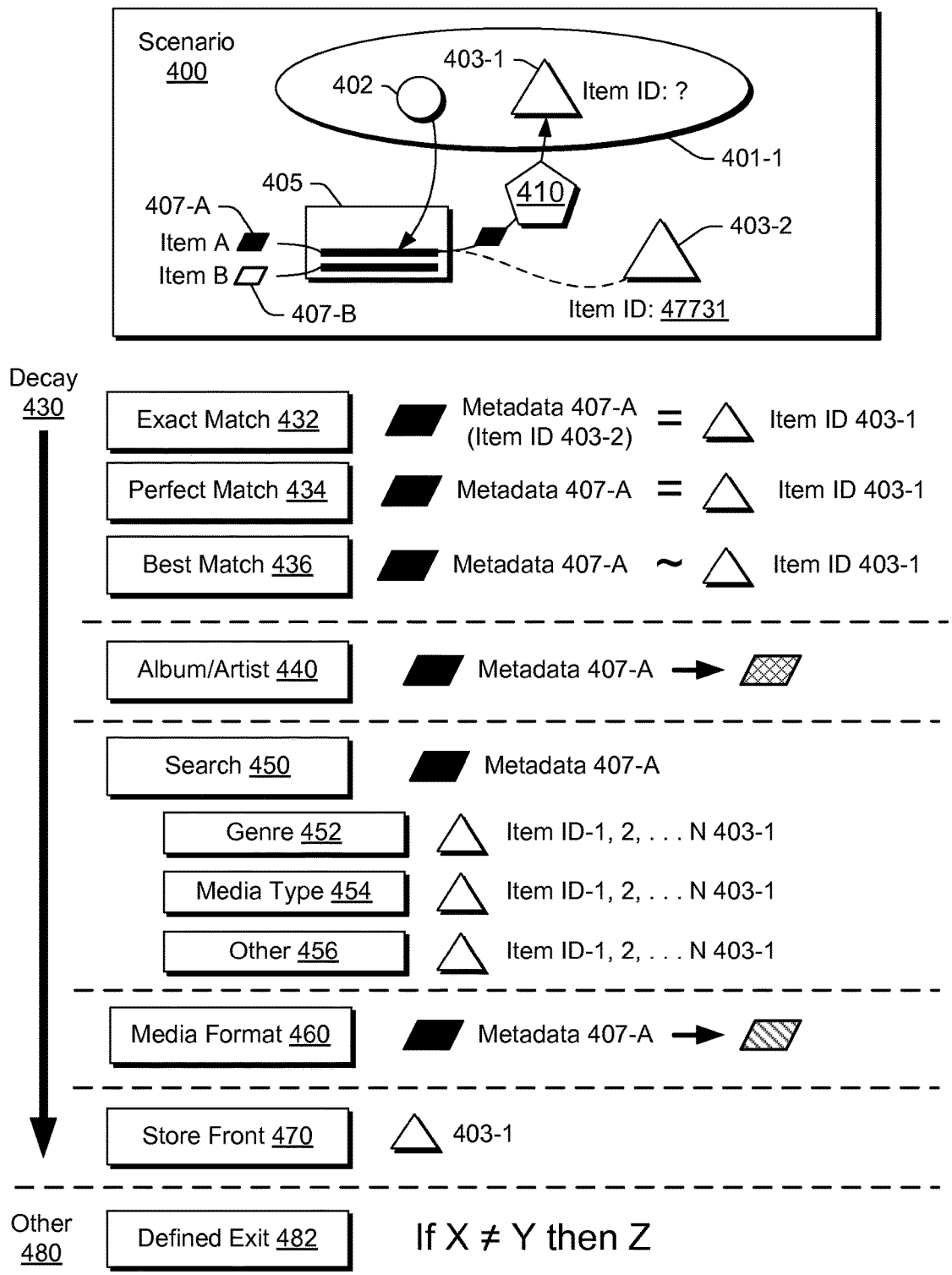
FIG. 4 is an example of a scenario and an example of a decay process.

As described with respect to FIG. 4, situations may arise where metadata, which may include one or more IDs, from a site do not exactly match that for a store front in another region where a user may be redirected. In other words, the metadata may be specific to an Internet store front in a region in which the site resides (e.g., where the IP address of the site indicates that the store resides) and not be particularly fit for locating a resource at one or more other Internet store fronts (e.g., associated with the store front) in other regions.

FIG. 4 shows an example of a scenario 400 where a user 402 in a region 401-1 actives a link of a site 405 for an item A, which has associated metadata 407-A. The user 402 may be operating an application such as a web browser or other application that may be configured for communication via a protocol such as the HTTP. As indicated, the link for item A can corresponds to an item ID of an Internet store front 403-2 in a region that differs from 401-1. In the example scenario 400, the item ID may be a numeric string (e.g., "47731"). As mentioned, for an iTunes Store, various types of IDs may be provided in a URL. Additionally, or alternatively, metadata may include one or more parameter values (e.g., term, country, media, entity, attribute, limit, lang, explicit, etc.).

For the scenario 400, where the user 402 cannot perform transactions with the Internet store front 403-2 (e.g., according to one or more rules), the redirector 410 may redirect the request, including its metadata 407-A (e.g., ID(s), parameter (s), etc.), to the Internet store front 403-1. As to identifying content (e.g., item A) at the Internet store front 403-1, various situations may arise, as explained with respect to a decay process 430, which may be hierarchical in its logical structure (e.g., optionally provided as a state machine). As an example, metadata may be translated based on best match logic to be relevant to another store.

The decay process 430 may proceed via one or more relational operations such as an exact match 432, a perfect match 434, a best match 436, an album/artist 440, a search 450, a media format 460, a store front 460, a user defined 482, etc. The decay process 430 may proceed via decisions that form a decision tree (e.g., or a state diagram), which may be tailored based on metadata provided by a link. For example, where metadata includes an item ID for an Internet store front in one region and, if an exact match does not exist for that item ID in an Internet store front in another region, the decay process 430 may proceed via a store front operation 470 that redirects a user to an Internet store front in the appropriate region.

While particular hierarchy of decay logic is described in the example of FIG. 4, decay logic may be configured to account for various factors (e.g., based on learning, redirection service options, etc.). Further, while the example is described with respect to certain goods (e.g., digital music), a hierarchy and decay process may be tailored with respect to the goods, services, etc. (e.g., for applications, appliances, tools, etc.). Thus, categories such as "album" or "artist" may be, for example, "application suite" or "developer".

The decay process 430 may include caching information and optionally learning via a learning algorithm. For example, the data handling schemes 324 and 326 may include caching in the cache 316 as well as learning to manage cached information to expedite redirects and to enhance user experience (e.g., to redirect a user to content that is exact or deemed acceptably relevant to desired content). Such an approach may include determining whether a user navigates away from a store front or otherwise interacts with the store front in a manner that indicates that a redirect may not have been optimal (e.g., optionally including analysis of times, comparisons with other shoppers, etc.). For example, where a user wants to purchase a song (e.g., mp3 or other format file), if the redirect delivers the user to the song but recorded by a different artist, the user is likely to interact with the store front until she finds the correct song, if available.

In the example of FIG. 4, the exact match 432 may correspond to situations where an ID is exactly the same across associated store fronts in different regions; the perfect match 434 may correspond to situations where all metadata lines up perfectly across associated store fronts; and the best match 436 may correspond to situations where metadata overlaps to at least a certain extent (e.g., processing to remove brackets, parenthesis, etc., for live versions, deluxe versions of an album, media type is the same, etc.).

In the example of FIG. 4, the album/artist 440 operation may correspond to situations where a match cannot be made at the highest level and thus a match is made at the next highest level and so on (e.g., cannot find a match of a song so redirect a track link to land on an album page, a bonus song only available on an album that is available in a specific country, cannot be found at the highest and next highest level then descend to another level such as artist, etc.). While various examples pertain to songs, various approaches may apply to other digital media including, for example, applications. As to applications, metadata may include categories, application developer, etc. Further, decay may apply to any of a variety of goods, services, etc. For example, an on-line retailer may provide white goods, small appliances, tools, etc. As an example, consider a tool that performs a specific function (e.g., a hex wrench of a certain size). A decay process may search for tools that can perform the same function (e.g., hex wrench size), optionally within sets of tools (e.g., a wrench set), materials of construction, handle size, etc.

In the example of FIG. 4, the decay process 430 may include the search operation 450. For example, if a match is not possible for a song at an album level or an artist level due to too much noise or false positives then the search operation 450 may be initiated, for example, with one or more terms parsed from a URL, the site where the URL exists, etc., to assist a user in finding what he desires. For the search operation 450, such a search may be initiated using an API or other features associated with one or more store fronts or other databases (e.g., AMG database, etc.). As an example, a decay process may perform a search that formulates a URL link to drop a user at a results page of a search performed using at least some metadata. Further, results from the search operation 450 may be analyzed as to relevance, number, etc., and a decision made as to whether such results should be communicated to a user, for example, via a redirect to a page at the originating site or via a redirect to a page at a store front site or via a redirect to a page at a database site (e.g., AMG database, etc.). Where search results are deemed as being less than optimal, detracting from user intent, etc., the decay process 430 may proceed to another operation.

As shown in FIG. 4, the search operation 450 may include a search by genre operation 452 (e.g., user is dropped in a genre listings page for the same genre that the original item came from such as in response to no match for the band U2 and the song "With Or Without You", so drop to a "rock" genre page); a search by media type operation 454 (e.g., user is dropped at the front door of the store for the same media type such as in response to cannot determine genre of the U2 song "With Or Without You", so drop at the store front).

As to the media format operation 460, the decay process 430 may include an option such that at any point in decay a logical flag may be inserted to allow for the addition of other media formats (e.g., media types) to be included (e.g., to expand a search, number of results, etc.). For example, where an original link is for a digital music download on Amazon.com but at a certain level (e.g., a definable level in the decay process), expanded media options may become available so that a search can start searching for CDs or digital download music videos. As to media formats, such formats may include categories: ebook (audiobook, paperback, hardcover, Kindle book); mp3 track (CD, music video); VOD TV Show (DVD, VOD Movie. VOD Rental), etc. The redirection service may optionally provide standard, customizable, etc., options for a client or clients (e.g., site owners, etc.). Such options may include learning that aims to provide an optimal user experience, commercial benefit, etc.

As mentioned, the decay process 430 may perform a store front operation 470, to redirect to an entry page (e.g., home page) for a store front. Such an operation may be a default operation, for example, where a link is malformed upon receipt by a redirection service, where a link cannot be properly parsed to initiation a process, where an error is thrown due to a problem with a link, etc.

The defined exit operation 482 is an example of another type of operation 480, which may or may not be part of the decay process 430. Such an exit may optionally be defined by a client of a redirection service (e.g., owner of a site), for example, to define an error page that a user would be redirected to at any point in a decay process by flagging where the decay should stop. As an example, a default may be to never show a client's error page and allow the decay to go all the way to the store front. Consider a situation where a client only wants song tracks returned to users, i.e., the client never wants their users to be dropped to an album or lower. In such a situation, the client could define an exit operation to stop the decay process after the best match operation 436 (e.g., to redirect a user to an error page instead of decaying further).

In various examples described herein, a redirector may be a computer or computing system (e.g., a server) that includes an interface that receives a URL responsive to a user activating an Internet link via an application (e.g., a browser application, an application that presents a user interface for activating an Internet link, etc.) where the URL includes metadata for an item specified by a country-based Internet store; circuitry that identifies a base country of the user by resolving an Internet Protocol address associated with the user (e.g., according to a device running the application, etc.); circuitry that decides if the base country of the user differs from the country of the country-based Internet store; and circuitry that formulates, if the base country differs, a URL for redirecting the user to a country-based Internet store for a country that corresponds to the base country of the user. As an example, the interface may be a network interface operable according to one or more standards associated with the Internet. As an example, the circuitry that identifies may include hardware, software, etc., that resolves an IP address to identify a region. As an example, the circuitry that decides may include hardware, software, etc., that compares a code resolved from an IP address to a code associated with the country-based Internet store. As an example, the circuitry that formulates may include hardware, software, etc., that formulates a URL using memory and a processor, which may access information stored locally, remotely, or locally and remotely. As to the URL, it may provide for directly redirecting or indirectly redirecting (e.g., first redirecting to an affiliate).

As described herein, a computing system may include circuitry that determines whether an item specified by a country-based Internet store matches an item specified by a country-based Internet store for a country that corresponds to a base country of a user. In such an example, circuitry may parse URL metadata to issue a query to a database, issue a call specified by an application programming interface of the country-based Internet store, etc.

As described herein, a computing system may include circuitry that determines a best match for an item for a country-based Internet store for a country that corresponds to a base country of a user. Such a system may include circuitry that formulates a URL based at least in part on the best match, circuitry that parses the metadata for search terms, circuitry that issues a search to a database using at least one search term, etc.

As described herein, a computing system can include circuitry that formulates a URL that includes information for an affiliate of a country-based Internet store for a country that corresponds to a base country of a user (e.g., an affiliate identification code), circuitry that formulates a URL that redirects a user to a website of an affiliate of a country-based Internet store for a country that corresponds to a base country of the user, etc.

As described herein, a method can include receiving a URL responsive to a user activating a link via an application (e.g., where the application may be a browser or other application) where the URL includes metadata for an item specified by a country-based Internet store; identifying a base country of the user by resolving the user's Internet Protocol address; deciding if the base country of the user differs from the country of the country-based Internet store; if the base country differs, formulating a URL for redirecting the user to an affiliate website where the URL includes information for a country-based Internet store for a country that corresponds to the base country of the user; and, if the base country does not differ, formulating a URL for redirecting the user to an affiliate website where the URL includes information for the country-based Internet store. In such an example, the affiliate may be an internal affiliate or an external affiliate.

As described herein, a method can include determining whether an item specified by a country-based Internet store (e.g., according to an ID, descriptive data, etc.) matches an item specified by the country-based Internet store for a country that corresponds to a base country of a user (e.g., as specified by a code or resolved using an IP address). In such a method, if the item does not match, the method may include implementing a hierarchical decay process (see, e.g., example of FIG. 4) and formulating a URL for redirecting the user to an appropriate Internet store (e.g., or an affiliate website) based at least in part on the hierarchical decay process (e.g., results of a decay process, whether logical or informational).

In various examples described herein, various terms may be used such as: Publisher (e.g., a website owner, an application developer, a client of a redirection service, etc.); Affiliate (e.g., a Publisher, a website owner, a client of redirection service that is also a member of an affiliate network/program such as LinkShare, TradeDoubler, etc.); User (e.g., a person that activates, e.g., "clicks on", a link on a site, an app, etc., where that site, app, etc., may be at least a client of a redirection service); Link on a Site or App (e.g., a link that redirects a user to a redirection service such that the redirection service can perform various acts); Redirection Service (e.g., a service that has, for example, publishers as clients and that can redirect users, as appropriate, for example, either directly to an appropriate Internet store or to an affiliate program site, which, in turn, redirects the user to an appropriate Internet store as determined by the redirection service); Advertiser (e.g., iTunes, Amazon.com, someone selling something via an affiliate program, etc.); Affiliate Network (e.g., LinkShare, TradeDoubler, an aggregator of advertisers and publishers, etc.).

As an example, a redirection service may allow multiple geographically segmented affiliate programs to be used simultaneously through the use of a single URL on a website or from within an application (e.g., an iPhone application or other application). In such an example, the approach can involve detecting a user's IP address through a link and determining the user's geographic location. The original URL may then be translated from a source country to a URL specific to a country that matches the user's location. Further, a new URL may be encoded with a geographically correct Affiliate network's tracking information and the user redirected to this URL. As an end result, the user reaches the appropriate destination in the geographically correct online store front with proper affiliate tracking information in place.

As described herein, for purposes of e-commerce, a redirection service may provide geolocation services. As an example embodiment, consider a Publisher A that owns a website that is content based (for example, a blog). Using standard links also has the potential to direct his traffic to the wrong online store (wrong geographic location) where the traffic might not be allowed or able to purchase the intended goods. One example is if the traffic may need to have a bank account or credit card from the same region to purchase from the online store front or if the shipping costs would be too high due to international transfer. The traffic may also receive an error when following a standard link as their settings for their default store front will conflict with the store front to which the traffic is directed.

Using a redirection service, the Publisher's specialized links would first send traffic to the Service Provider where the traffic's proper country is determined systematically. The traffic is then dynamically built a new, custom URL that is specific to the geographically-appropriate target online store front. The traffic is redirected to the correct store. This keeps the user from receiving an error, allows the traffic to land on the most relevant page for the link they clicked and provides the ability to purchase the intended item(s).

As described herein, a redirection service may provide for allowing multiple geographically segmented online storefronts to be used simultaneously through the use of a single URL on a website (e.g., accessed via a web browser application) or from within an application (e.g., an iPad application, an iPhone application, etc.). As an example, a process can use logic to determine the geographic location of the user and then translate and encode a URL into a geographically relevant link which includes the tracking information and directs the user into the appropriate store front based on location.

Figure 5:
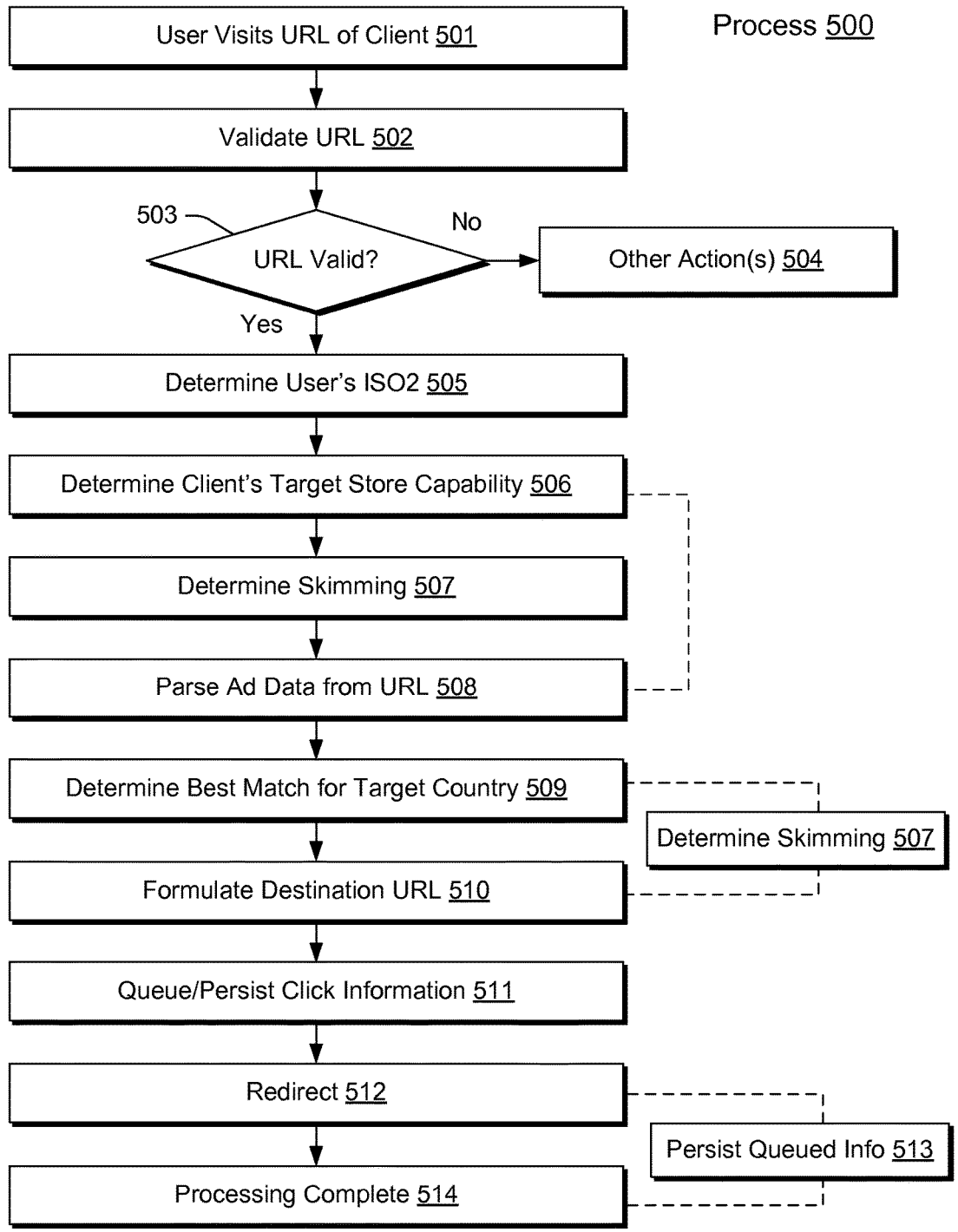
FIG. 5 is an example of an overview of a process (e.g., from navigating a user from clicking a link to arriving at specific online store front)

FIG. 5 demonstrates an example of an overall process 500 that happens when clicking on a link 501. The process 500 starts with a link (e.g., URL) on the Publisher's site or application being clicked by a user and finishes with a final redirection 512 with the user ending up at the most relevant page in the appropriate store front. Once the process 500 starts and the user clicks on that link 501, the URL Validation process takes place 502 which is explained further in FIG. 6.

Figure 6:
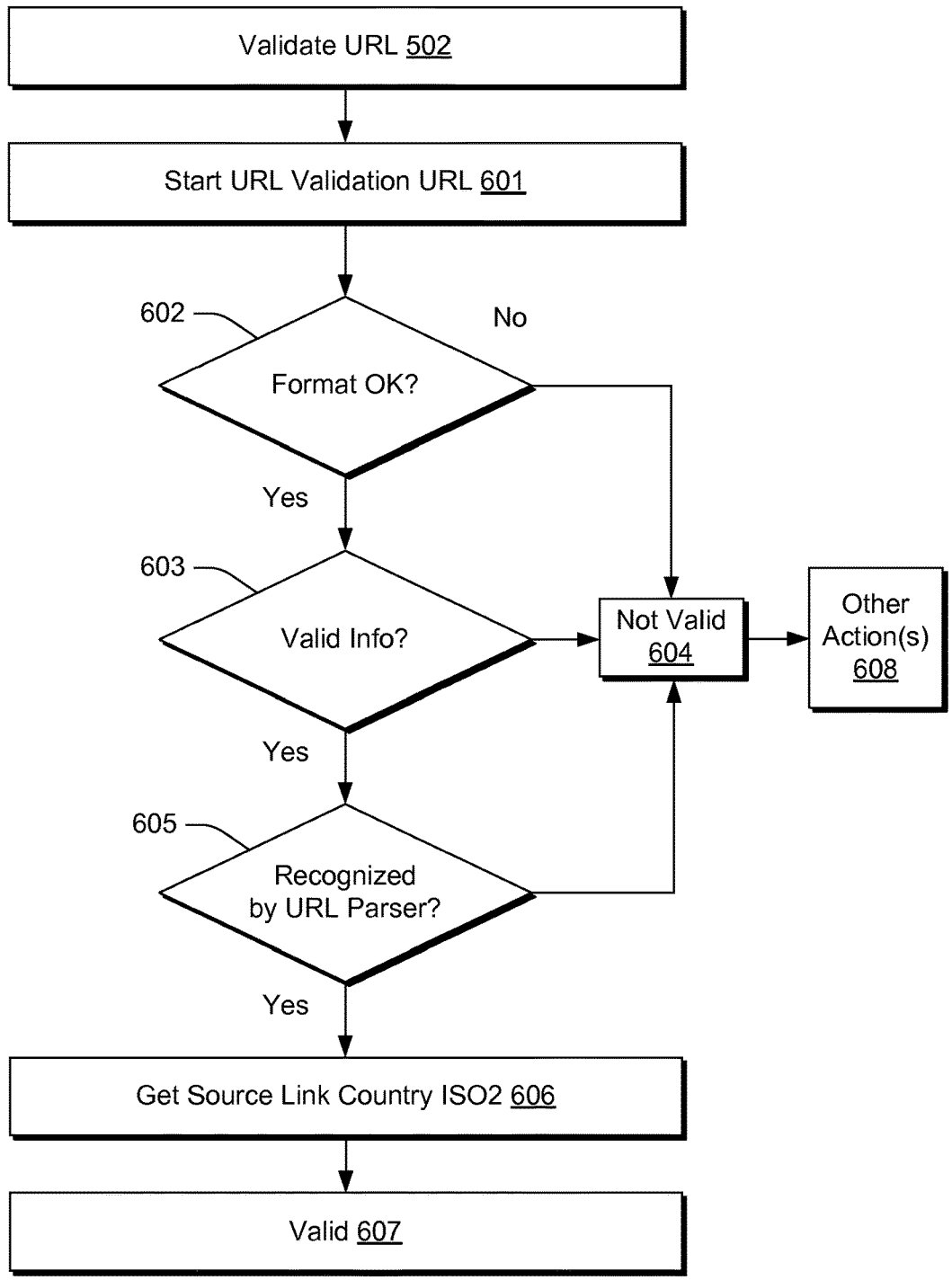
FIG. 6 is an example of a flowchart of the URL validation process shown in FIG. 5.

If the URL is determined to be invalid following the process 600 in FIG. 6, then, per a decision block 503, one or more other actions may occur, as indicated by another action(s) block 504. The block 504 may, for example, take the original URL that was passed in and pass the user on to it or drop the user at the store front. As another example, the user may be dropped at a client defined error page (e.g., as if a decay process hits a maximum allowed level of decay). However, if the link is determined to be valid, per the decision block 503, it will then go through a process to determine the user's International Standards Organization 2 letter geographical country code, or ISO2 for short 505. The ISO2 determination process is further explained in FIG. 7 but is used to determine the correct geographic store front for the user. ISO2 country codes are the standard for identifying the different countries throughout the world.

Figure 8:
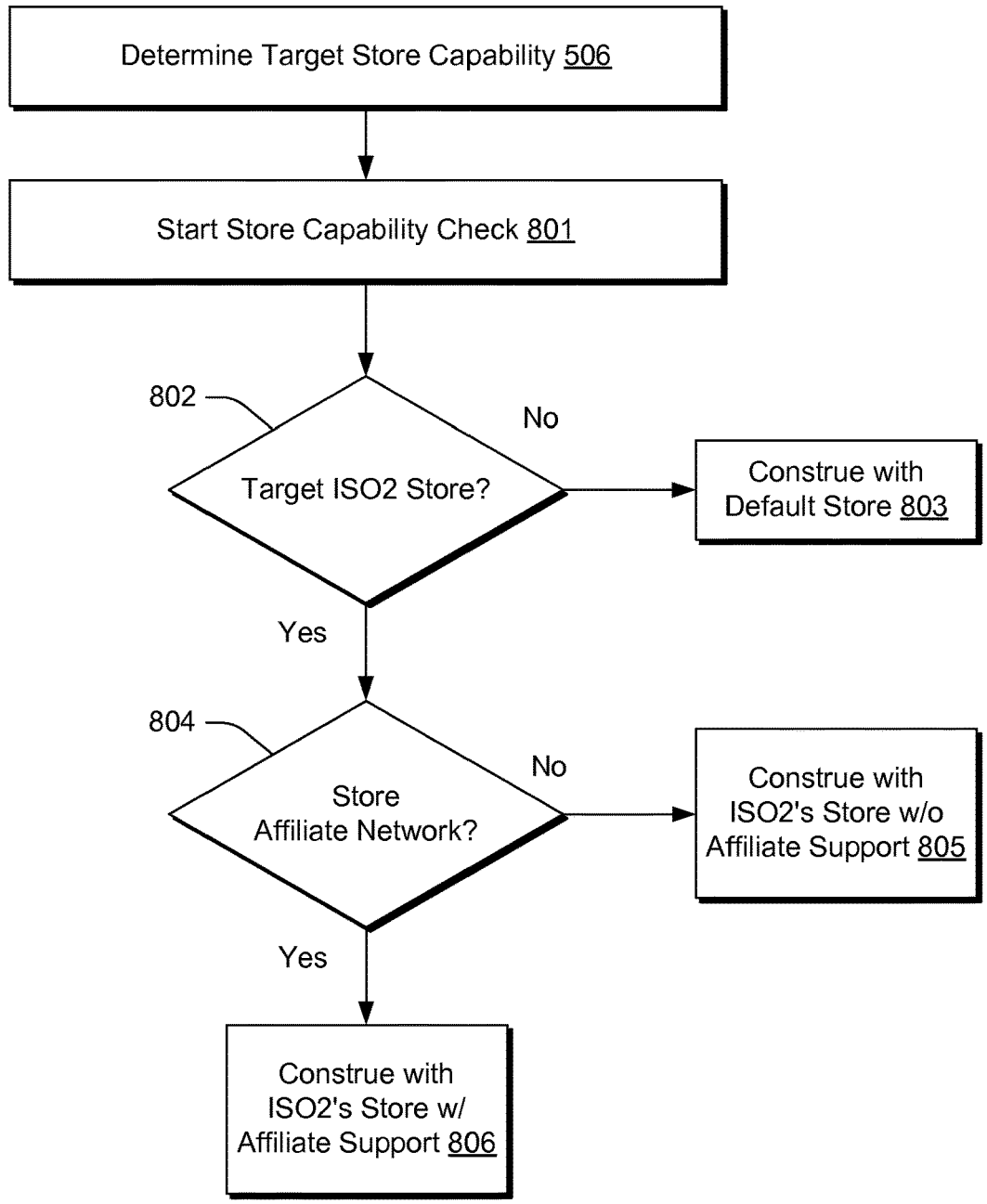
FIG. 8 is an example of a flowchart of the target store determination process shown in FIG. 5.

Once the user's ISO2 Country Code is determined, the next step in the process 500 is to determine if the item the original link pointed to is available in the user's appropriate store front 506. This procedure defines if there is a store front available in that particular geographic location that best matches with the user's country as shown in FIG. 8.

As an example, a check may be performed to determine if the exact same item is available in a store in the geographic location (e.g., correct country store). If so, the process can continue; whereas, if not, a lookup may be performed to get item metadata and then at least some of that metadata used to find a best match in the appropriate country store.

Figure 9:
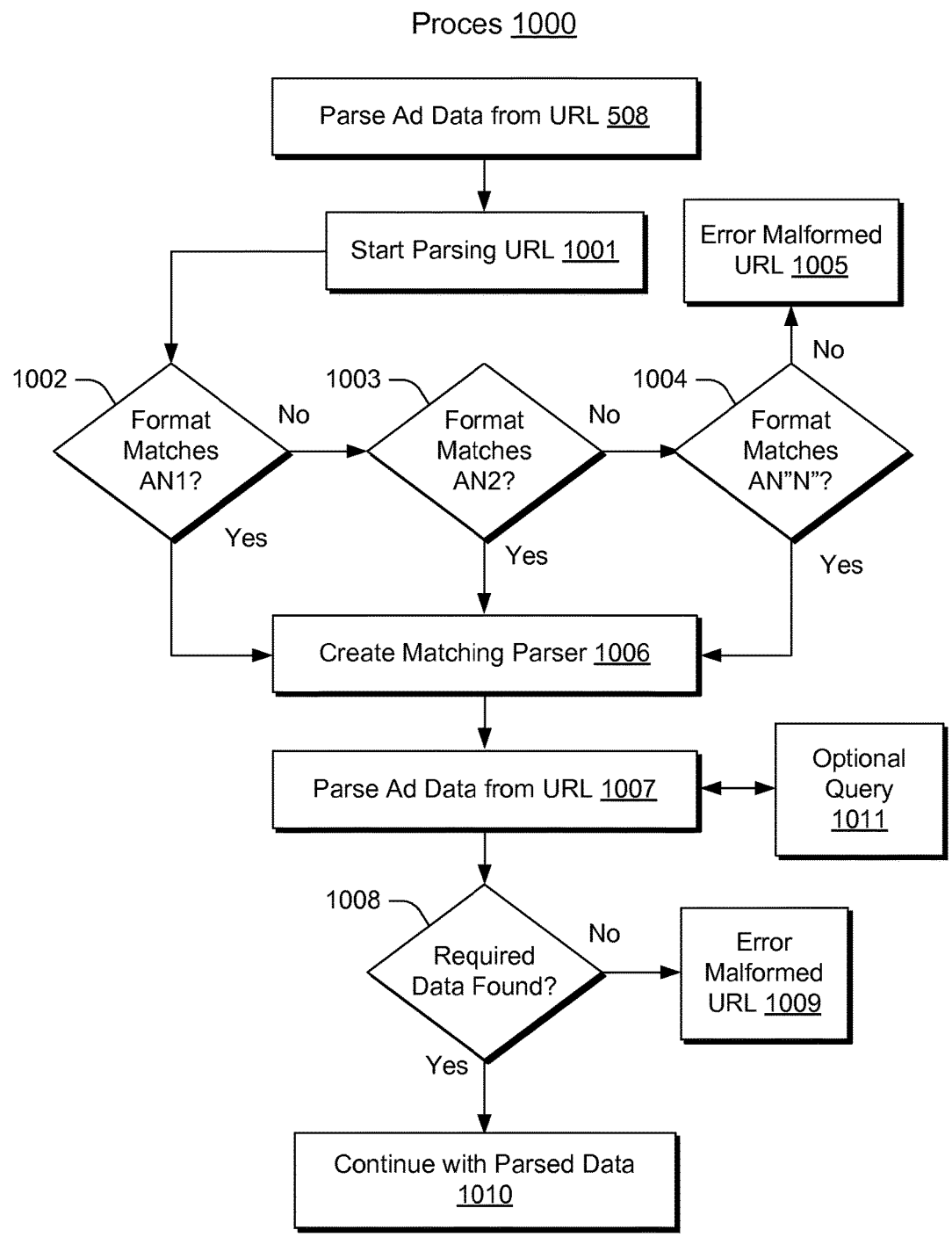
FIG. 9 is an example of a flowchart of the Advertiser data parsing process shown in FIG. 5.

Then the original deep link (e.g., landing page URL, search link, item link, category link, etc.) is analyzed in order to parse the Advertiser's data 508. This involves breaking down the link to determine what data is contained in the link. A process 1000 shown in FIG. 9 illustrates data parsing in more detail.

As an example, if an original deep link is bad (e.g., an ID no longer works for an item), a method may include accessing metadata originally captured about an item, for example, to investigate whether an alternative source may be available (e.g., for a desired item, etc.). As an example, such a process may be part of an evergreening process that aims to direct a user to an appropriate site, location, etc., whether corresponding to an original source, an alternative source, etc.

Figure 10:
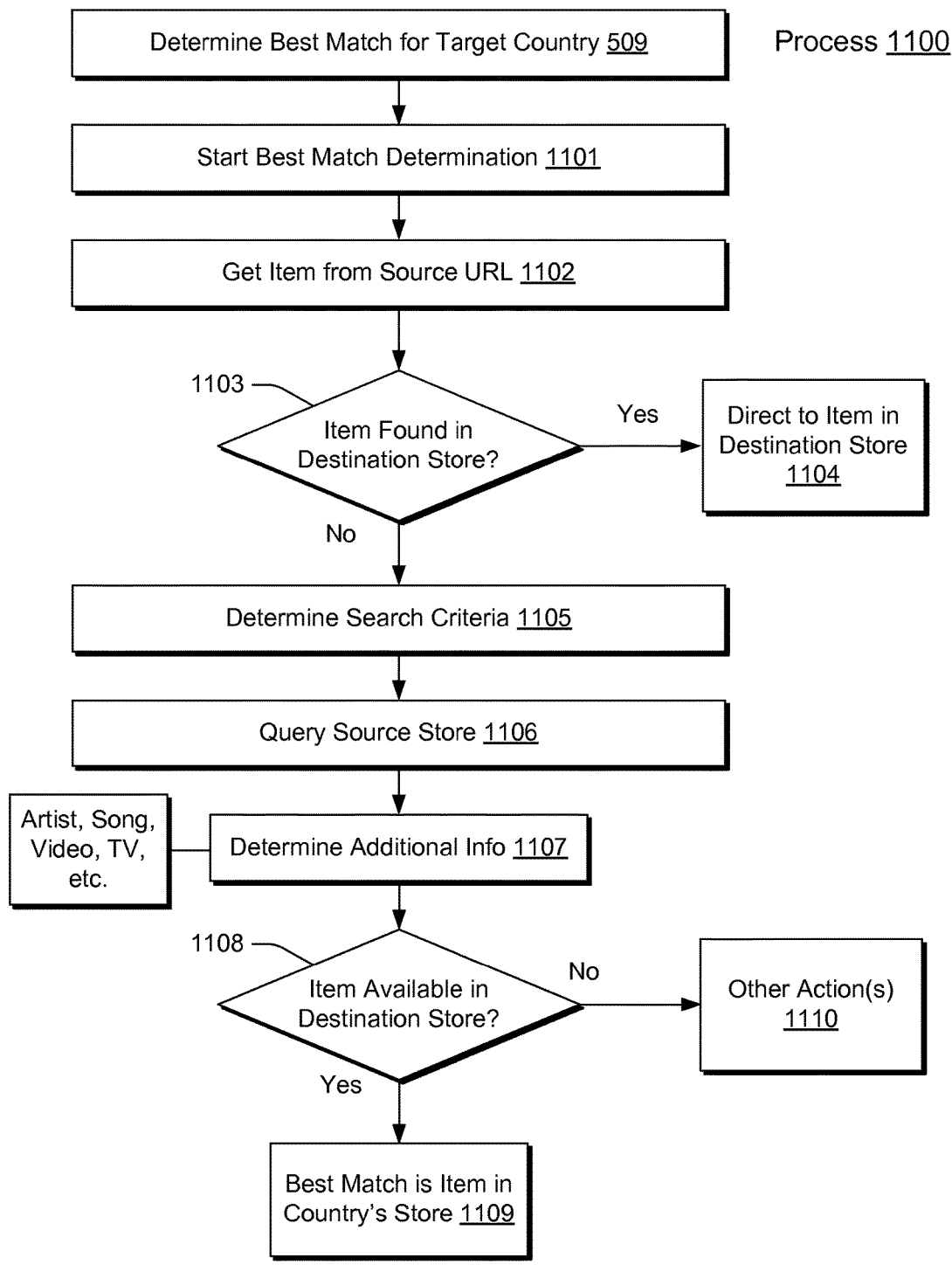
FIG. 10 is an example of a flowchart of the target country/store determination process shown in FIG. 5.

Referring again to FIG. 9, at this point, if the data is parsed correctly, the service will start the procedure to determine the best matching item for the target country's store front (which was determined by the user's ISO2) 509. The service determines if the specific item mentioned in the original URL can be found and, if so, uses relevant metadata for that item to find a similar item in the geographically correct online store front. FIG. 10 shows an example of this process in more detail.

If the requested digital good, hard good, service, etc., is available in the user's location the next step is to formulate the original deep link (e.g., landing page URL, search link, item link, category link, etc.) into a link that includes all of the updated information for that user's geographical location (e.g., store front, item number, etc.) 510.

For the process 500, a user is redirected to a new link that has been appropriately formulated and formatted 512. Once redirected, the user arrives at an appropriate online store front while affiliate tracking information is preserved and applied. As an example, such a process may occur where the store front is an Amazon.com store; noting that for other stores, a user may be redirected via an affiliate network (e.g., an affiliate network of an iTunes store).

Figure 11:
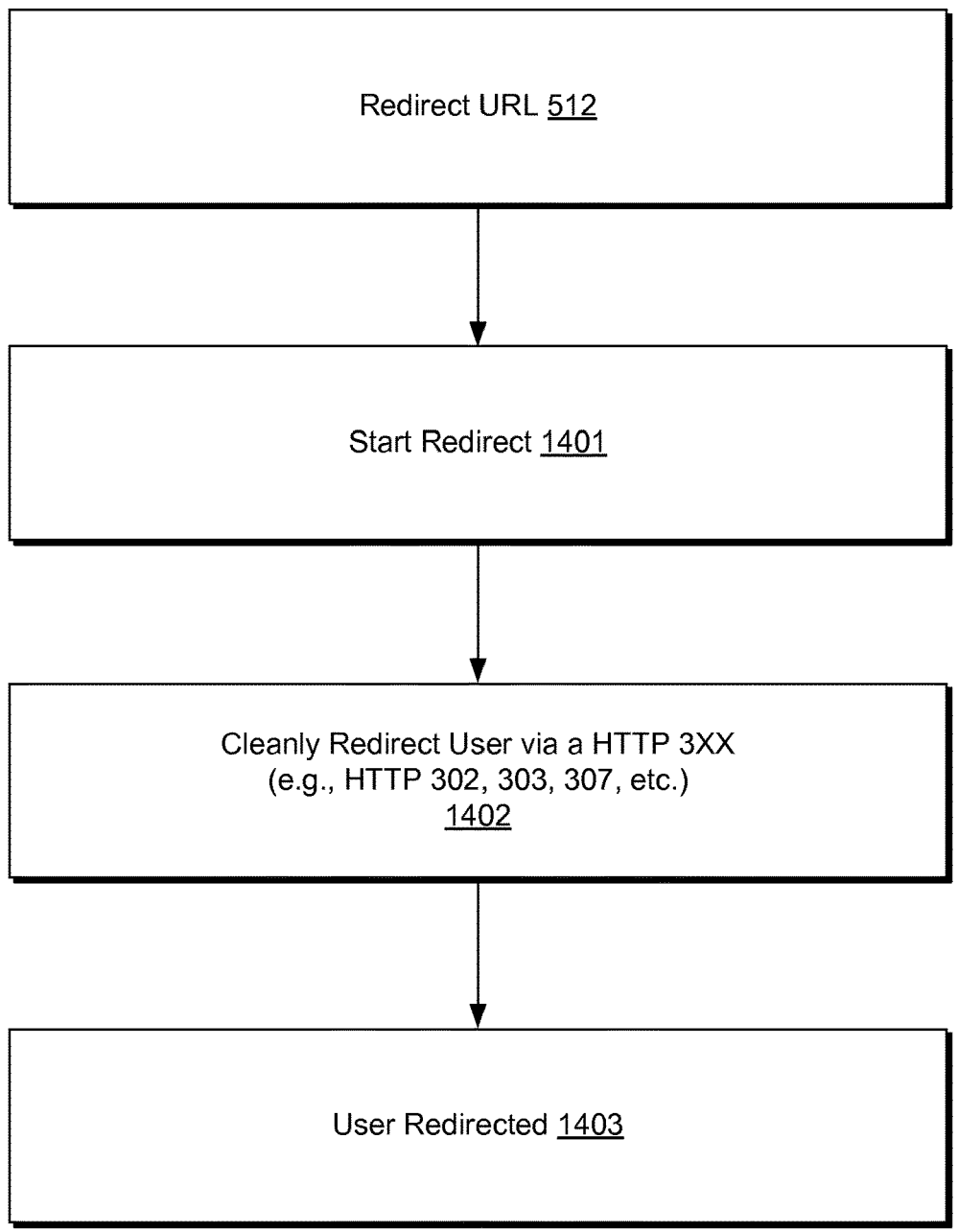
FIG. 11 is an example of a flowchart of the URL redirection process shown in FIG. 5.

The process 500 may be hidden from a user, i.e., the user has no indication that one or more redirects have occurred (e.g., to a redirection service and then to a store front other than the one associated with a link on a site). FIG. 11 shows an example of a redirection process 1400. In the end the user will arrive at an online store front on the page, preferably with the item most relevant to the referenced item in the original link. As shown in FIG. 5, for a redirection service, after processing of the click, the process 500 may be complete (see completion block 514).

FIG. 6 shows the process 600, as corresponding to block 502 of FIG. 5. The first step after a user clicks an affiliate deep link is the Service Provider validates the URL 601. The URL validation process includes making sure the original URL clicked by the user includes the necessary information in order for the user to get to his desired destination. The first step of the validation is to make sure that URL has the correct general format 602. If the format is considered not valid (e.g., missing information, incomplete URL, etc.) then the process is halted and determined Not Valid 604, which may continue to another action(s) block 608 (see, e.g., block 504 of FIG. 5).

If, however, the general format appears to be correct, the next step is to validate, for example, that the Service Provider's identification information is present and correct 603. If information is missing or incorrect, the process may continue to a determination block 604 that indicates at least some of the information as Not Valid. If appropriate information is present and is formatted correctly, then a URL Parser is called to make sure the overall format, including the appropriate information, is recognized 605. If not, the process may be deemed Not Valid 604 and one or more other actions may occur per the other action(s) block 608 (see, e.g., block 504 of FIG. 5, decay process of FIG. 4, etc.). If, however, the above are deemed valid, the link's source country's ISO2 will be determined and noted 606. As to appropriate information, it may include metadata used by a redirection service sufficient to determine, for example, a user, a country, and a store that the link was built from, which may optionally be a username and a store link itself.

Figure 7:
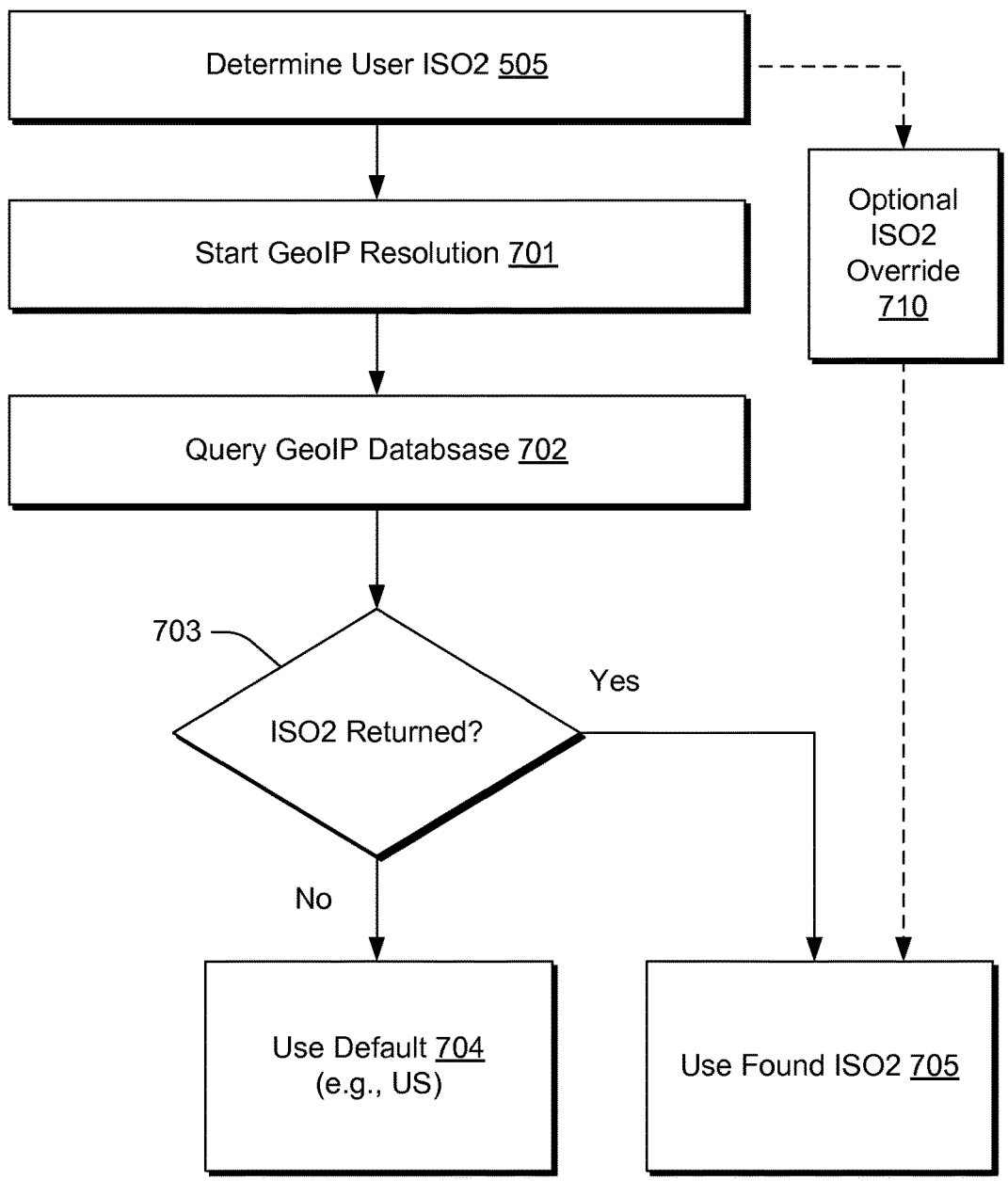
FIG. 7 is an example of a flowchart of the User ISO2 determination process shown in FIG. 5.

FIG. 7 shows a process 700, as corresponding to block 505 of the process 500 of FIG. 5. Once the original URL goes through the validation process and is deemed valid, the user's country ISO2 is determined 505. The process 700 is started by resolving the user's IP Address to the user's base country 701. This may be accomplished by querying a database that lists the ISO2 codes for each available country and the IP addresses present there 702. More generally, a data store may be accessed, which could be via an API provided by an advertiser (e.g., iTunes® store, Amazon-.com® store, etc.) or a database that may be proprietary to a redirection service (e.g., optionally built from a data feed provided by an advertiser), or a combination of an API and proprietary database or other manner (e.g., caching service, etc.). Per a decision block 703, if the user's ISO2 code is available based on their IP address, the database will report that code. If there is not an ISO2 code for the user's IP address, or if the IP address is not listed, a default (the US in this case) will be used 704. However, if the user's IP reports an ISO2 code, the reported code will be used instead 705.

As an example, if a redirection service geolocates an IP address to an ISO2 instead of a "no match" then it may be used. A person, system, etc., building a link may be able to override, for example, to use a specific ISO2 instead of IP address based approach to country or region determination (see, e.g., optional override block 710).

FIG. 8 shows a process 800, as corresponding to block 506 of the process 500 of FIG. 5. Based on the ISO2 that is determined in the previous step, the service will commence the process 800 in a commencement block 801 to find the target store that best matches the user's ISO2. In a decision block 802, a decision is made as to whether the Advertiser does not have a store front within the user's geographical region. If so, the user will be defaulted into, for example, the US store front 803.

FIG. 9 shows a process 1000 as corresponding to the block 508 of the process 500 of FIG. 5. In such an example, the service may look at the data within the link and checks to see if the pertinent information matches any of the Affiliate Networks for the particular store front, for example, via a series of decision blocks 1002, 1003 and 1004. These decision blocks aim to determine which of a number of Affiliate Networks the original link is from. As an example, the affiliate network (or at least a country, store, etc.) may be provided in a link indirectly according to a redirection service ID for a client or, additionally or alternatively, via metadata. If the form of the URL does not match any of the affiliate links, a Malformed URL error is thrown 1005. If the form matches one of the Affiliate Networks, then the next step is to create a matching Parser to read the data from the URL 1006. Parsing of ad data from the URL occurs next, at block 1007. Once the data has been read, the service may optionally query a data store specific to the Advertiser's store front to verify that the data is present, per block 1011. Such a query may be germane to one or more source/target country stores via an API, cache, local data, etc. Such a query may be local, remote or a combination of local and remote queries (e.g., via an API of an Internet store, a proprietary database of a redirection service, etc.). While the block 1011 is shown as being aligned with the Parse block 1007, it may be located elsewhere, for example, after block 1010.

After the Parse block 1007, a decision block 1008 follows that decides if the data matches what can be found in the store front. If so, the process 1000 continues to the next step with the parsed data 1010. If not, the process will halt and throw a Malformed URL error 1009.

An example of a link "build" process can optionally programmatically build a redirection service provider link from a catalog of raw landing page links. Such an approach may be appropriate where a database of raw links exists and links can be programmatically built. As an example, a base redirection service link may be http://target.georiot.com/Proxy.ashx?grid=64& where to this is added "GR_URL=" with a URL encoded raw landing page URL attached to the end. For example, if a target raw landing page URL is http://itunes.apple.com/us/album/once/id331012810?i=331013504, the URL is encoded to: http %3A %2F %2Fitunes.apple.com %2Fus %2Falbum %2 Fonce %2Fid331012810%3Fi %3D331013504. Given a base "georiot" URL (e.g., http://target.georiot.com/Proxy.ashx?grid=64&), to this may be added "GR_URL=", followed by the encoded version of the raw landing page URL (e.g., as in previous step) to yield a quick build style link: http://target.georiot.com/Proxy.ashx?grid=64&GR_URL=http%3A%2F%2Fitunes. apple.com %2Fus%2 Falbum%2Fonce%2Fid331012810%3Fi%3D331013504.

FIG. 10 shows a process 1100 that corresponds to the block 509 of the process 500 of FIG. 5. Once the data has been parsed from the URL, the service will then attempt to match that data to an item in the appropriate online store front. The process 1100 commences in a commencement block 1101 by taking the information from the parsed data in the previous step. Given the parsed information, an item ID may be present, which is then taken for further processing 1102. In a decision block 1103, a query, a lookup, etc., may be performed to determine whether an item exists in the destination store (i.e., appropriate country store) that corresponds to the item ID from the parsed URL. Based on such a query, lookup, etc., the decision block 1103 decides if that item exists (e.g., a matching ID is found that corresponds to the ID from the parsed URL). If that item exists, then the user will be directed to that item in the destination store (e.g., appropriate country store) 1104. However, if the specific item does not exist or is otherwise not retrieved via a query, lookup, etc., the best match will be determined, for example, in a process of using less specific queries until a suitable match may be found. If no match is found then one or more other actions may occur per another action(s) block 1110, for example, a link to the general store front may be used for redirecting a user.

Again, where the decision block 1103 decides that the item is not found in the destination store (e.g., appropriate store for a user), the service may proceed to a determination block 1105 to determine one or more search criteria (e.g., based on metadata). The determination process includes a query or lookup 1106, for example in a source country store (e.g., store associated with activated URL) or database using at least some information about the item (e.g., at least some metadata from the original URL). A determination block 1107 follows that determines one or more aspects of the item, for example, a "type" the item may be classified as (e.g., digital media, a product, a service, an app, etc.).

In a decision block 1108, the additional information may be used to once again perform a query, lookup, etc., to determine if the item can be found in the destination store (e.g., appropriate store for the user). Since there are some items that may be unavailable in all stores, the last query, lookup, etc., sent in this process may be to determine if the exact item being requested is available within the specific country's store. If the item is available in that particular country's store, the best match to the parsed data (e.g., and optionally from data retrieved from an API, data store, etc., about an item defined in the metadata that was parsed) will be the individual item within the store front 1109. If not, the "best match" may be to redirect the user to the destination store front instead, as another action 1110. For example, if the original link was for a specific song and the service first tried to find that specific song, if there is no match the service may search for the same artist and, if still no match, then the service may search for the correct media type (music) and again if a match is not present the final result may be a link to the general store front. As an example, the decay process of FIG. 4 may be implemented.

A process can include parsing data from a URL associated with a source store. In turn, a query may be issued to a destination store (e.g., an appropriate country or regional store) using the parsed data, which may include an item ID. If, in response, the item is identified, then a user may be redirected to that item. However, if, in response, the item is not identified, then a "best match" process may commence, which may or may not find that exact same item. Such a process may query the source store using an item ID and then extract additional data (e.g., metadata) about the item. Using this additional data, the destination store may once again be queried in an effort to, optimally, find the exact same item. However, as the additional data may not be sufficient to uniquely identify the item, a next best effort may be to provide a URL to a group of items at the destination store (e.g., an album, a tool category, a director's films, etc.). Such a process may be iterative in that some metadata may be used first and if a unique item is not returned, then more metadata may be used.

FIG. 11 shows a process 1400 as corresponding to the block 512 of the process 500 of FIG. 5. The process 1400 commences in a commencement block 1401. As mentioned, once the click's information has been queued for persistence into the Service Provider's database, the last step in the process 500 is to redirect the user using the new URL created in block 510 (see, e.g., FIG. 12). The entire process 500 up through this point may be hidden from the user and performed, for example, within several milliseconds so users are unaware of the URL redirection. At this point, the user will be cleanly redirected using an HTTP redirect 1402 (e.g., a 3XX redirect such as 302—"Found" or other 3XX redirect or equivalent thereof). At this point the user is redirected to the appropriate item in their geographically specific store, or into the default (e.g., US) store if their location doesn't have a unique store front 1403. Examples of 3XX redirects include: 301 Moved Permanently; 302 Found; 303 See Other; 304 Not Modified; 305 Use Proxy; 306 Switch Proxy; 307 Temporary Redirect; and 308 Resume Incomplete.

Figure 12:
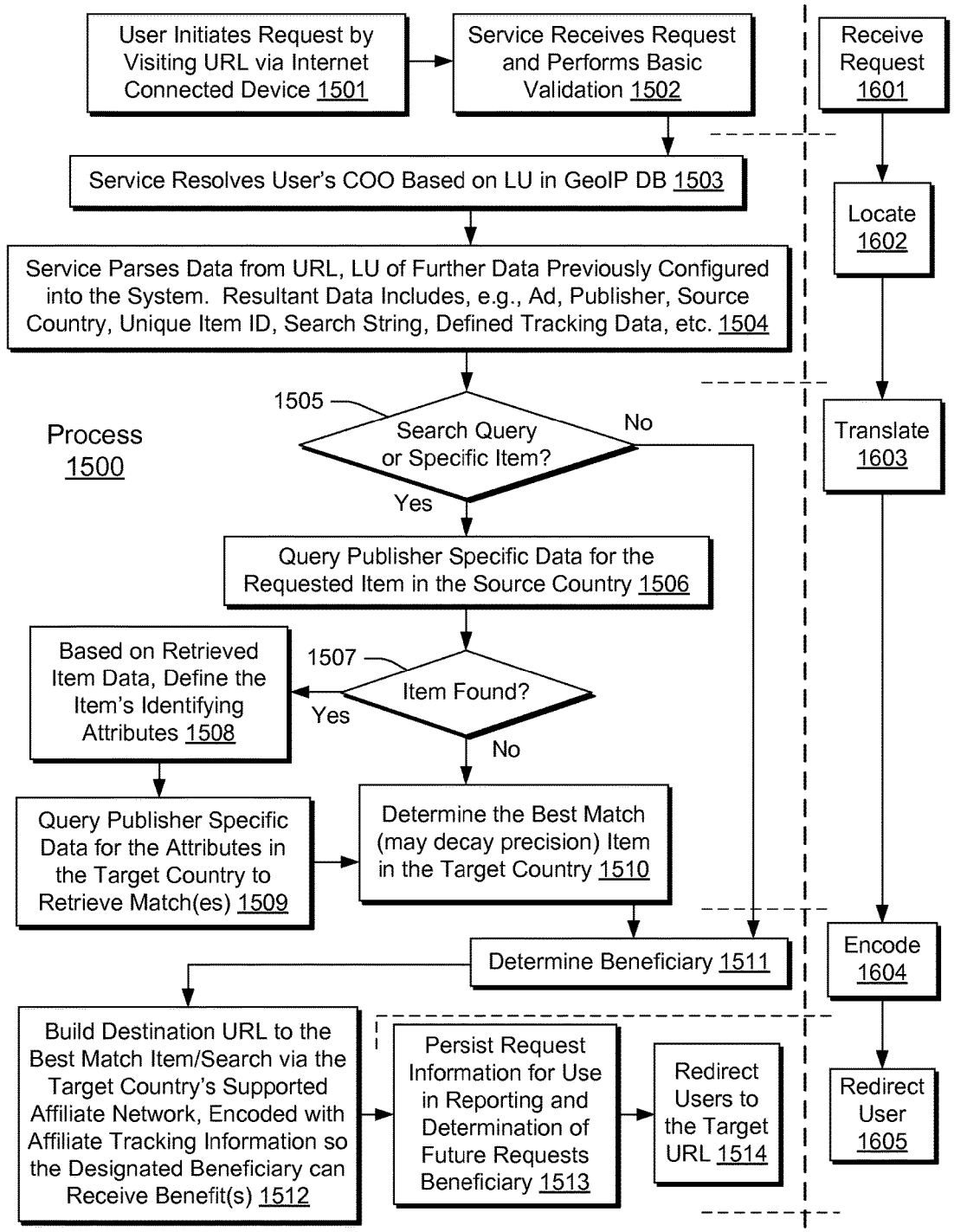
FIG. 12 is an example of an overview of a process starting with receiving a request through redirecting a user to an appropriate destination.

FIG. 12 shows an example of a process 1500 that occurs when clicking on a link. The process 15000 starts with a link on the Publisher's property initiated by a user 1501 and finishes with the final redirection 1514, the user ending at the most relevant page in the appropriate online store front. Also shown in FIG. 12 are blocks 1601, 1602, 1603 and 1605, which are part of a process 1600 shown in FIG. 13, which represents a breakdown of the process 1500 into five general steps: Receive Request 1601, Locate 1602, Translate 1603, Encode 1604 and Redirect User 1605.

Figure 13:
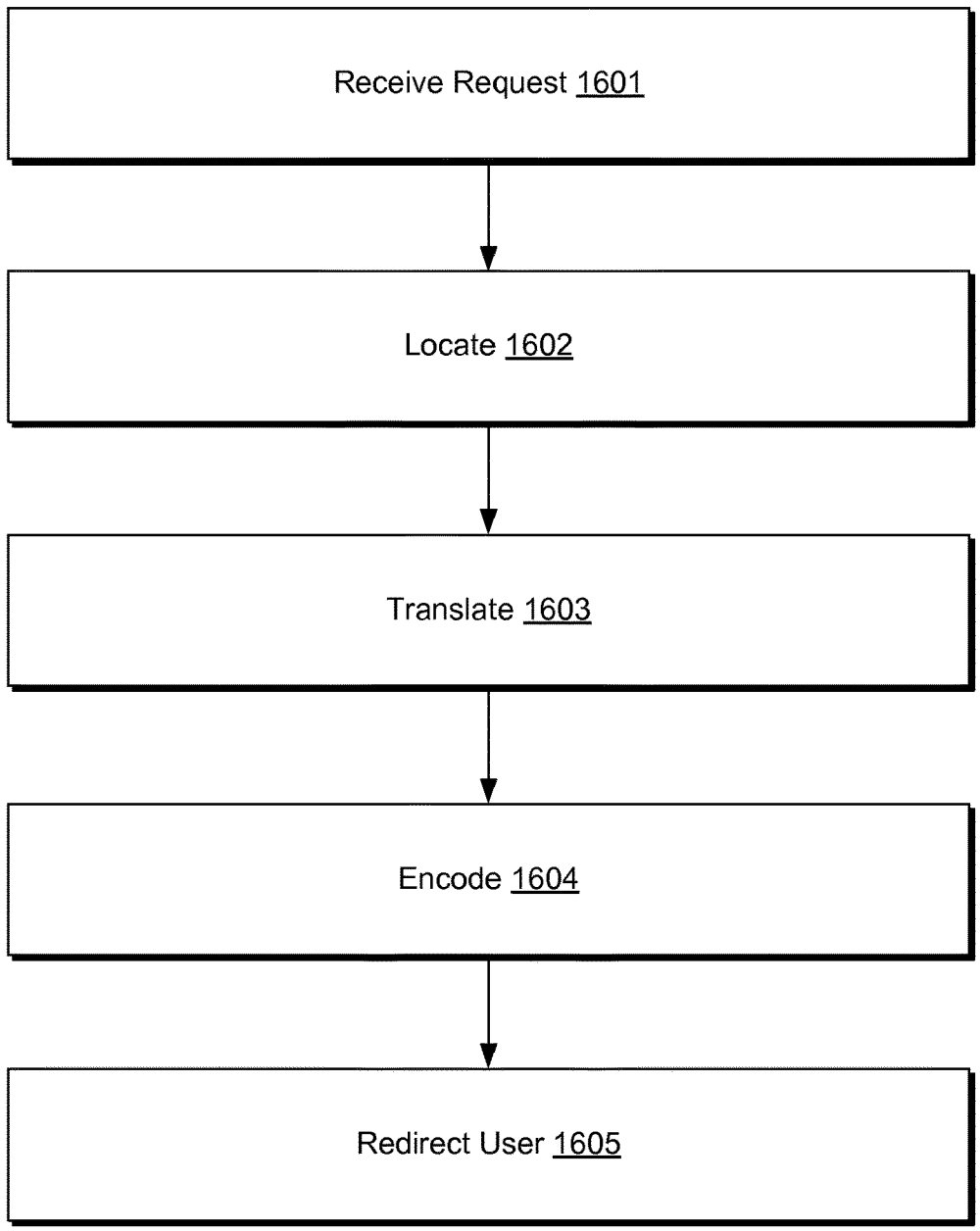
FIG. 13 is an example of a flowchart of details mentioned in FIG. 15.

As shown in FIGS. 12 and 13, the process 1500 or 1600 starts when the service receives a request (Receive Request 1601). For the second step, the service goes through a process to determine where the user is geographically located by looking up their IP address in a GeoIP database. This step also includes parsing relevant information from the URL (Locate 1602). After the user is located, the service will then determine the most applicable URL for the user by identifying data in the requested URL. The service will lookup details about the intended destination, whether it be to a specific item, or more general (e.g., this can include taking into account search items, category links, etc.). The service will then, using the data from the previous query, locate the best match for the user's geographic location (Translate 1603). Once the end point is determined, the service will create a new URL for the store front and item. If there is no perfect match for the intended item the system will allow the precision to decay until a best match is made. The new URL takes into account the appropriate affiliate encoding (Encode 1604). Finally, the user will be redirected to the appropriate affiliate network (Redirect User 1605).

Referring to the various details of FIG. 12, the process 1500 commences at step 1501 when a user initiates a request by visiting an affiliate link from any Internet connected device, which can include but is not limited to laptops, desktops, smart phones, and tablet computers.

The service receives the request and performs a basic URL validation process at 1502. The process includes ensuring the necessary information is included for the user to get to their destination as well as checking the general format of the link.

After the request has been received, the next step 1503 is to resolve the user's Internet Protocol (IP) Address against a list of IP blocks and geographic regions in order to place the user within a geographical location. This is a common practice called "geolocation." If the system is unable to determine the country of origin, it will assume a default target country (e.g., US).

The following step 1504 determines the format of the incoming URL so that data can be gathered. The URL is matched against a list of supported formats. Once the format is determined the service is able to extract the data required. Based on this data the service is able to determine items such as Advertiser, Publisher, Source Country, Unique Item Identifier, Search String, and tracking data.

At this point, the process 1500 can split based on what data was identified in step 1504. The data can either be for a specific item or can contain search criteria (see step 1505). If the data contains search criteria then the process resumes at step 1511. If the data identified is for a specific item at 1505, the service will then query a data store specific to the Advertiser's store front at step 1506. If the data store returns information for the item specific query then the process moves to step 1507. If no data is returned the process moves to step 1510. When data is returned from the original data source, the service notes the item's relevant attributes as at 1508. Those relevant attributes are then used to query the data source specific to the user's location at 1509.

Depending on the quality and number of results returned the service may repeat the query with reduced precision by omitting certain relevant attributes at 1510. This process will continue until a best match is determined. The best match may have the same or reduced precision as the requested item.

The next step 1511 for the service may optionally be to determine who may be the beneficiary of the potential.

Once the end destination is determined, the service will, based on information associated with the original URL, formulate a new URL to get the user to the proper destination based off the steps above 1512. The new URL will be encoded, and will point to the result that was determined to be the best match from the original URL.

After the URL has been reformulated (e.g., reformulated, translated, etc.) into the new deep link with the proper tracking code, the click information is then persisted into the Service Provider's database in step 1513. The information regarding the geolocation, date, time, and item they clicked on is queued up to be stored (e.g., persisted) into the Service Provider's database for tracking and reporting purposes (e.g., stored locally and then directed to a database for longer term storage). This information may be later used for the Publisher's benefit and determining traffic origin and for trend analysis purposes, reports, etc.

Once the click information has been queued for persistence into the Service Provider's database, the last step 1514 in the process is to redirect the user using the new URL created. The entire process up through this point is transparent to the user. Finally, the user is redirected to the best match item in their geographically specific store, or into the default store if their location doesn't have a unique store front.

Figure 14:
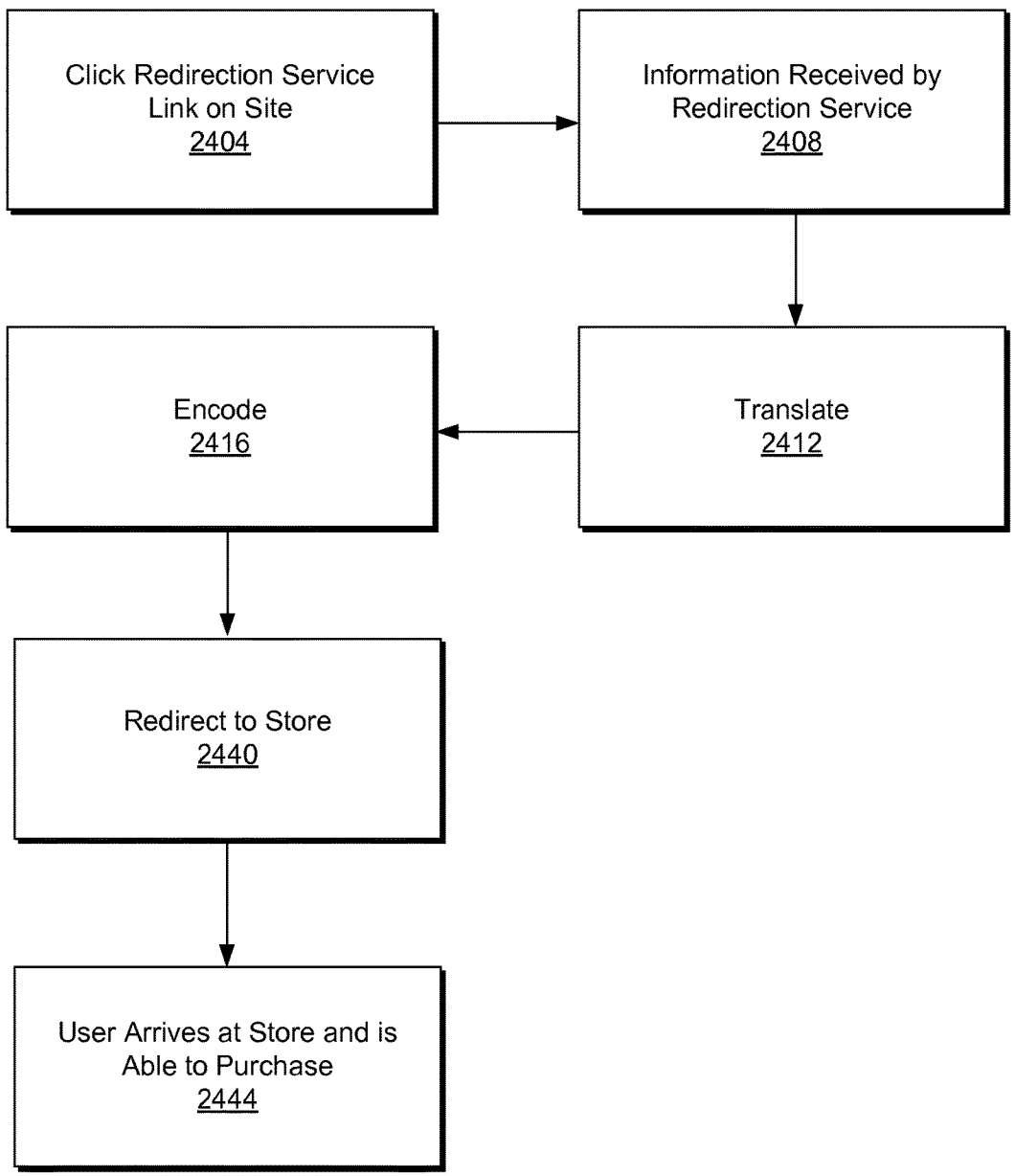
FIG. 14 is an example of a method for redirection.

FIG. 14 shows an example of a method 2400. In a click block 2404, a user clicks on a redirection service enabled link from an iOS app, website, blog, etc. In a reception block 2408, the redirection service receives information transmitted in response to the click, where the redirection service determines the user's location and an Internet store associated with the link. In a translation block 2412, the redirection service translates the link to a redirection URL that matches the Internet store for the user. In an encode block 2416, the redirection service encodes the redirection URL and, if appropriate, for the determined user's Internet store, in a redirection block 2440, the redirection service redirects the user via the redirection URL to the Internet store. As indicated, in an arrival block 2444, the user arrives at the Internet store and is able to purchase an item associated with the redirection enabled link that appeared on the iOS app, website, blog, etc.

As described herein, a redirection service can provide a link "proxy" service that allows for multiple geographically-segmented affiliate programs to be used simultaneously. The service can send a click on an affiliate link first to the redirection service where the service geo-targets where the user is coming from, translates the link to work best for the user's regional store and then affiliate encode the link such that the site owner (e.g., publisher, affiliate, client, etc.) receives commissions on possible sales.

A redirection service may use geo targeting, which is a practice of delivering content that is specific to a user's location. The redirection service may implement a process (e.g., IP address resolution or other) that identifies where the user is clicking from in order to determine which Internet store is the best match for that user.

A redirection service may use one or more rules and logic to quickly translate a link's intended destination into a link appropriate for an international user and his relevant Internet store. A redirection service may, after a link is translated, encode it with the appropriate affiliate parameters to match the standards for the relevant affiliate network, if one exists. Matching the user's appropriate Internet store to the corresponding affiliate network and program helps to ensure that a sale will result in a commission for the owner of the site. Such a process can also provide for exchange of user level tracking parameters, for example, for seamless internal tracking.

Rerouting each user to the right item in the correct Internet store drastically improves affiliate conversion rates for a site owner (e.g., publisher). Instead of sending every click to one Internet store and hoping that store can purchase from that store, a redirection service can act to send each user to an appropriate regional Internet store where he has a better chance of finding the item and making a purchase.

It may be assumed throughout this description that each location, user, client, affiliate, etc., has appropriate hardware and software to perform various actions. Known terminals, processors, routers, switches, modems, servers, connecting links, communication methods, ISPs and/or output devices/interfaces may be used, as appropriate.

Figure 15:
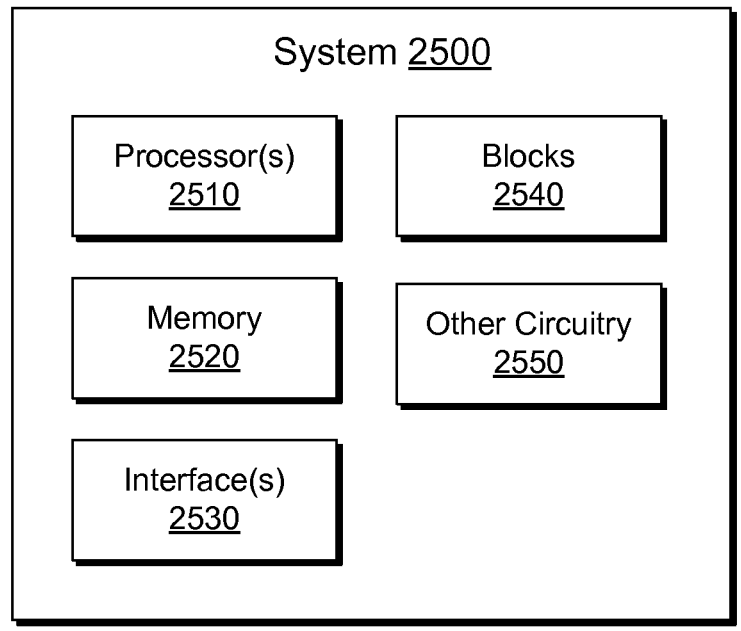
FIG. 15 is an example of a system (e.g., a server or other computing device) and an example of a method that may transmit, receive, etc., data structures.
Figure 15:
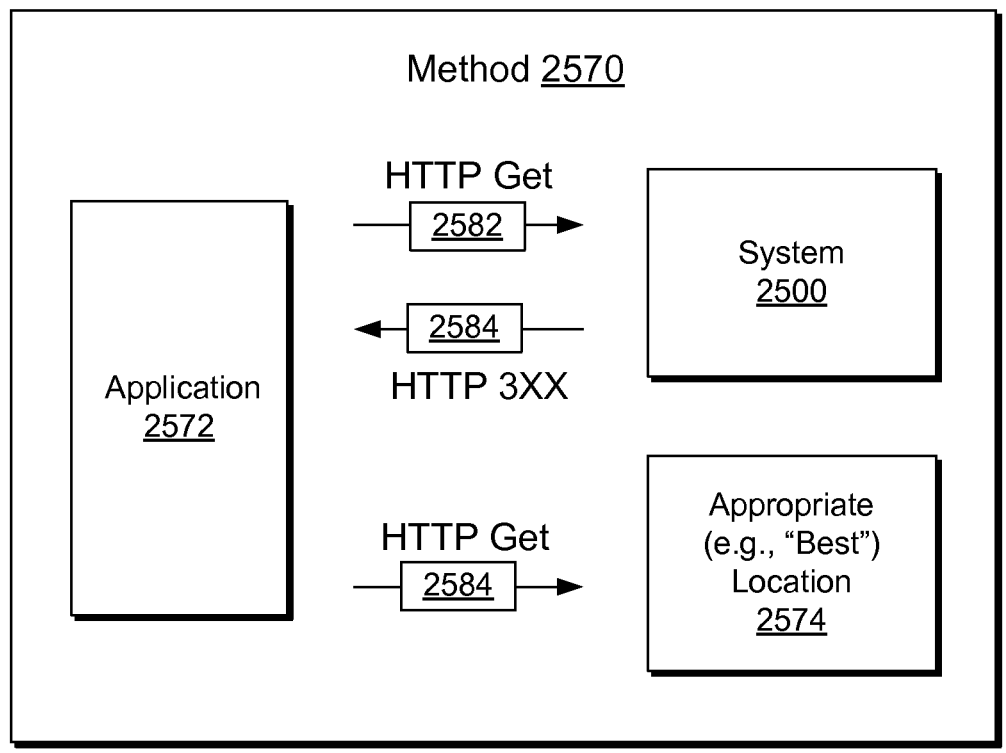

FIG. 15 shows an example of a system 2500 as including one or more processors 2510, memory 2520, one or more interfaces 2530, one or more blocks 2540 and other circuitry 2550 and an example of a method 2570 that includes various data structures 2582 and 2584. The system 2500 may be a server configured to run one or more services to serve needs of users of other computing devices, systems, etc., on a network. As an example, the system 2500 may include circuitry configured to perform one or more actions described herein. Circuitry may be in the form of hardware, software, etc. In the example of FIG. 15, the processor(s) 2510 can access the memory 2520, which may store instructions provided in the form of one or more blocks 2540. A block may be a computer-readable medium that includes processor executable instructions that instruct the system 2500 to perform various actions. In various figures, blocks are presented with respect to processes, methods, etc. Such blocks may be in the form of one or more computer-readable media. Such computer-readable media may be "non-transitory", in other words, physical media (e.g., memory, optical disk, etc.) as opposed to a transitory medium such as space, which may carry transitory signals.

As to the one or more interfaces 2530, the system 2500 may include one or more network interfaces configured for communication with the Internet, either directly or indirectly. As to the other circuitry 2550, it may include wireless circuitry configured for communication via one or more wireless networks, optionally including one or more "cellular" networks (e.g., 3G, 4G, etc.). The system 2500 may optionally be configured as a single device or as a collection of devices.

In the method 2570, an application 2572 is configured to communicate directly or indirectly via the Internet (e.g., a web browser or other application). In the example of FIG. 15, communication is shown as occurring via HTTP, noting that other types of communication may be used. The system 2500 acts to direct the application 2572 to an appropriate location 2574 (e.g., the "best" location). As shown, the system 2500 includes features to act on receipt of a URL 2582 and to formulate a redirect URL 2584. As described in various example, the redirect URL 2584 may be a "best location" URL, for example, based on logical operations performed by the system 2500, which may include one or more operations that rely on resources external to the system 2500.

The URL 2584 may be formulated according to a data structure. Such data structures may be considered as having data fields, for example, as appended or concatenated to form a URL (e.g., according to standard characters such as "&", etc.). Data fields may be specific to one or more parties and may provide for one or more functions (e.g., item-related, commission-related, etc.). Such a data structure may exist at one or more locations stored in a memory (e.g., physical memory of a server, a client, etc.). Such a data structure may be formed using a process (e.g., a product formed by a process). For example, a data field or data fields may correspond to "best location" information determined by a decay process. Information included in one or more fields of the data structure may be or act as instructions to instruct an application (e.g., a browser application, a server application, etc.) to perform one or more actions (e.g., access information, transmit information, package information, etc.). As an example, information may optionally be structured according to an API call that causes a machine to perform one or more operations and optionally return information.

As an example, the system 2500 may include a URL parser block for parsing a received URL (e.g., URL 2582) to provide information to a logic block for formulating a new URL (e.g., URL 2584). A received URL may optionally include special metadata dictated by a redirection service (e.g., a service ID, etc.) that may instruct the system 2500 to use certain parser features, logic, etc. More generally, a received URL may include information such as one or more of an application ID, a client ID, a user ID, a store (e.g., iTunes, amazon.com, etc.) or a country a link is associated with (US, DE, etc.). The system 2500 may respond to receipt of such information and formulate a new URL for redirection to an appropriate location (e.g., as determined by a process performed at least in part by the system 2500).

Figure 16:
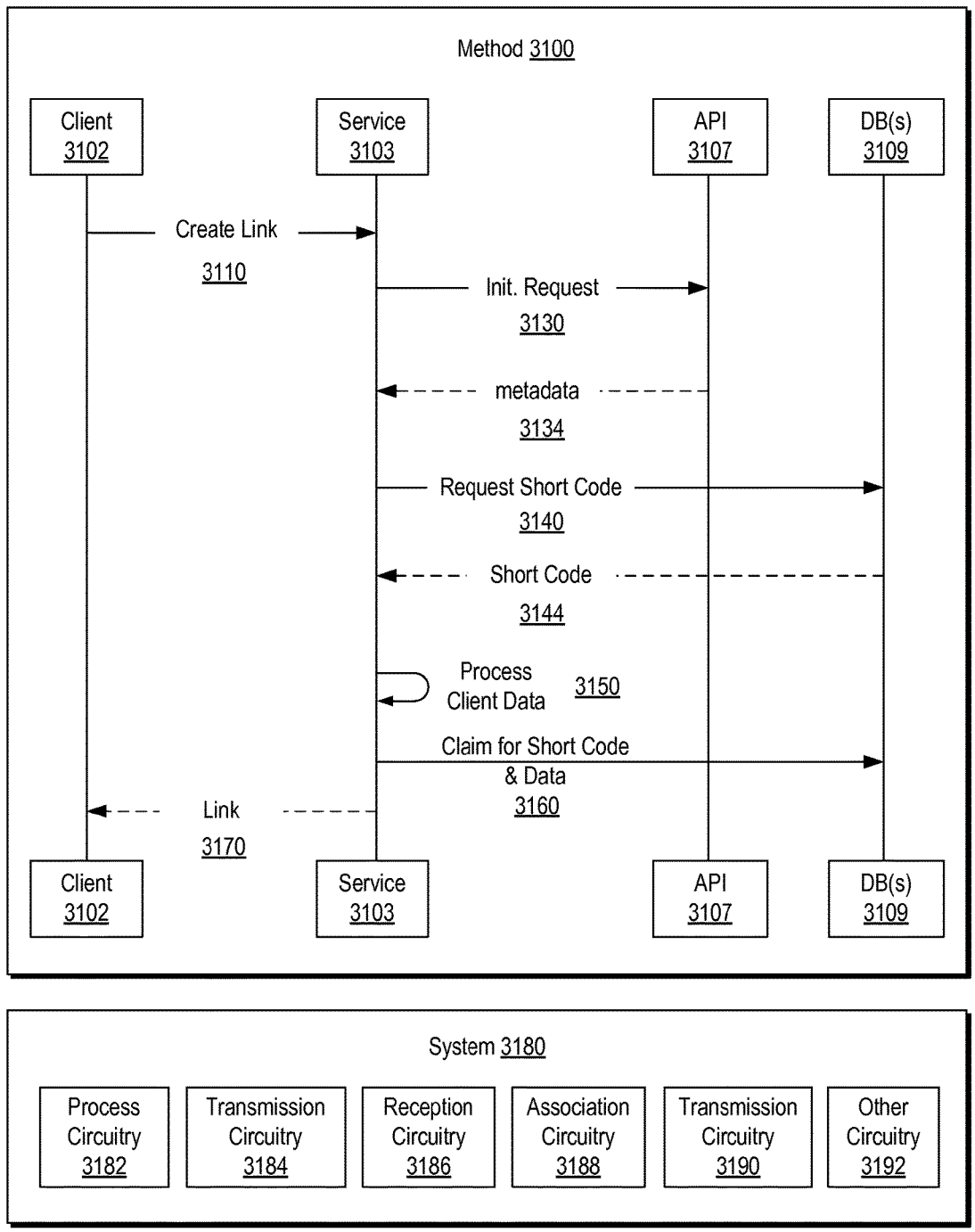
FIG. 16 is an example of a method and an example of a system.

FIG. 16 shows an example of a method 3100 that can include creating a link for a client 3102 of a service 3103. For example, the client 3102 may transmit a request to the service 3103 (e.g., a computing system of the service 3103) to create a link for use by the client 3102 in a website, a webpage, a game, an application, etc.

As shown in the example of FIG. 16, the method 3100 includes receiving a link creation request 3110. Such a request may initiate a process where the service 3103 creates a specialized, evergreen link (e.g., a link that is less likely to fail, be broken, etc.). As shown in FIG. 16, the service 3130 may receive the link creation request 3110 and based at least in part on information therein (e.g., an original URL, etc.), the service may transmit an initial request 3130 to an information source via an interface 3107. As shown, the interface 3107 may be an application programming interface (API) that can receive a call or calls that conform to a specification and that can in turn transmit information based at least in part on a received call (e.g., via type of call, call parameters, etc.). Such a process may be part of a validity check by the service 3103. For example, the service 3103 may perform the method 3100 in part by checking the validity of a link with an API, which may cause a look-up query based on an ID or other type of information (e.g., presented in the original link from the client 3102, etc.). As an example, an API implemented may be associated with a domain holder of an original URL; however, other types of interfaces, information sources, etc. exist. For example "All Music Group" (AMG) offers recognizable IDS while the iTunes® framework and the Amazon.com® framework use proprietary ID formats As an example, if the link is valid (e.g., per the initial request 3130), the result from the interface 3107 will include metadata, for example, about a transmitted ID (e.g., and thus the metadata will be associated with the link). As shown in FIG. 16, the service 3103 receives metadata 3134, if available via the interface 3107. In such an example, the service 3103 may save the received metadata, for example, in short term data storage (e.g., RAM, etc.) of a computing system.

As an example, where a link provided by the client 3102 is determined by the service 3103 to be valid, a request may be made by the service 3103 for a short URL code. In the example of FIG. 16, the method 3100 includes transmitting a request for a short code 3140, for example, by the service 3103 and to one or more databases 3109 (e.g., servers, etc. with access to stored information, etc.). As an example, a short URL code may be provided by a client or by a service. As an example, a query and subsequent reply may determine if a short URL code is available however, as an example, the code may not necessarily be claimed. As an example, a method may include claiming a short URL, for example, prior to a request for short code creation and/or during processing a request for short code creation. In the method 3100, as indicated by an arrow from the one or more databases 3109 to the service 3103, a short code may be received by the service 3103 or, for example, an indication may be received that a short code is available. As an example, a service may have a stock of reserved short codes (e.g., a listing of claimed short URLs, etc.).

As an example, metadata received by the service 3134 (e.g., as returned in response to a call via the interface 3107) may be processed 3150, for example, such data may be summarized, parsed, etc. For example, consider changing XML into JSON, eliminating extraneous or unnecessary attributes and/or data, etc. As an example, the service 3103 may include one or more modules to perform such a process (e.g., computer-implementable modules that include computer-executable instructions to instruct a computer to process data).

In the example of FIG. 16, the service 3103 may transmit a short code and data 3160 (e.g., or transmit a claim for a short code and transmit data for association with the short code), which may be processed data per the process 3150, for example, to at least one of the one or more databases 3109. For example, the service 3103 may transmit to the database the metadata determined to be relevant and a confirmation as to the short code (e.g., a claim to a short URL code, etc.). In such an example, a database may record the relevant information (e.g., and register the claim, etc.) so that it may be referenced later, for example, responsive to a request, a query, etc.

As shown in the example of FIG. 16, the method 3100 includes transmitting a constructed link from the service 3103 to the client 3102. In such an example, the service 3103 generates, builds, creates, constructs, formulates, etc. a link for the client 3102 in response to receipt of the create request 3110. As an example, the service 3103 may transmit to the client 3102 a short URL code (e.g., a short URL) that, for such an initial request 3130, is associated with the link (e.g., original URL, etc.) that the client 3102 provided to the service 3103. As an example, an intermediary may optionally provide a request to the service 3103 on behalf of a client. In such an example, as in the example of FIG. 16, the service receives information that initiates a service-side process for link creation, which, if successful, may be expected to return a link (e.g., a short code link).

As an example, a client such as the client 3102 of the method 3100 of FIG. 16 may use the link as transmitted by the service 3103 (see action 3170). For example, the client 3102 may insert a short code (e.g., short URL) into a page, an application, etc. where that short code is used instead of an original code (e.g., a long code, a long URL, etc.). A client may utilize a created link in a website, an application (e.g., an "app", etc.), and/or in related marketing (e.g., due to a number of benefits, etc.).

FIG. 16 also shows an example of a system 3180 that can include circuitry that processes a URL for information 3182; circuitry that transmits at least a portion of the information via a network interface 3184; circuitry that receives metadata via the network interface responsive to the transmission of at least a portion of the information 3186; circuitry that associates at least a portion of the metadata with a short URL 3188; and circuitry that transmits the short URL 3190. As an example, the system 3180 may include one or more other types of circuitry 3192.

Figure 17:
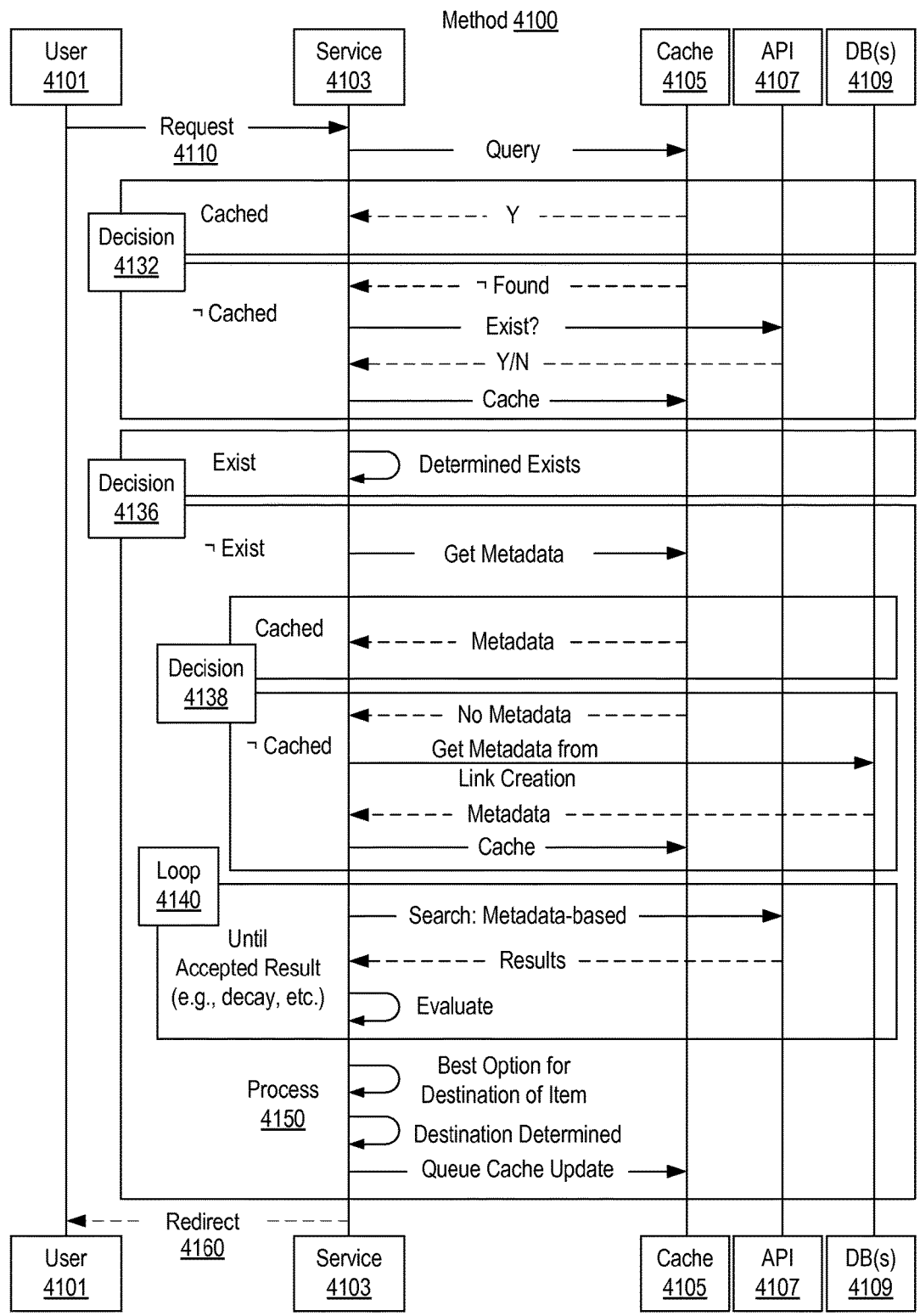
FIG. 17 is an example of a method.

As an example, the method 3100 of FIG. 16 may be an "Evergreen Link Creation" method. As an example, such a method may include one or more of the actions as follows:
title Evergreen Link Creation
Client->Service: Create Link
Service->3rd Party API: Initial request
3rd Party API-->Service: metadata
Service->Database: Request short code
Database-->Service: Return code
Service->Service: compile client metadata
Service->Database: short code+save metadata
Service-->Client: Provide link FIG. 17 shows an example of a method 4100 with respect to a user 4101, a service 4103, a cache 4105, an interface 4107 (e.g., an application programming interface) and one or more databases 4109 (e.g., data storage components, etc.). As an example, these may be operatively coupled via wired connections, wireless connection or wired and wireless connections. As an example, these may be operatively couples at least in part via one or more networks (e.g., LAN, Internet, the Cloud, etc.).

In the method 4100, a request is transmitted 4110 responsive to an action of the user 4101, for example, via a device of the user 4101 (e.g., a computing device) and the request is received by a device of the service 4103 (e.g., a computing device). In such an example, the received request 4110 initiates a query, for example, to the cache 4105, where the query is based at least in part on information in the received request 4110 (e.g., via parsing of the request, etc.). As an example, a request may be responsive to a user clicking a URL for an item available via an Internet merchant (e.g., on a webpage, in a game, in an application, etc.). As an example, a cache may be a storage mechanism (e.g., memory, etc.) that may store information for a period of time. For example, a cache may store information for a period of time of the order of a half a day, of the order of a day or of the order of days. As an example, a cache may include information that is accessible in a relatively short period of time, which may expedite processing of a request and, for example, redirection.

The method 4100 includes making a decision 4132 that decides whether the query identifies (e.g., finds) information in the cache 4105, for example, by performing a look-up of information in the cache 4105. In terms of speed, information being in a cache may provide that information more rapidly than obtaining information via an interface (e.g., an API, etc.). As an example, where information is not in cache, a method may decide that an item does not exist in association with a particular request. For example, a method may decide that a link does not work (e.g., or that a link does work) based at least in part on a look-up of information in a cache.

In the example of FIG. 17, where the decision making 4132 decides that pertinent information is not found in the cache 4105, the method 4100 may proceed to a call via the interface 4107 (e.g., an API call). The interface 4107 may be, for example, an interface for a database associated with an Internet merchant, an information service (e.g., song catalog, movie catalog, game catalog, etc.), etc. In response to the call, the service 4103 (e.g., a computing device of the service 4103) may receive information that indicates whether or not information associated with one or more of the call parameters is available via the interface 4107. If information is available and received, the service 4103 may transmit at least a portion of that information to the cache 4105 (e.g., or optionally another data storage device, etc.).

The method 4100 may include making another decision 4136, for example, to decide whether an item specified at least in part by the received request 4110 is demonstrated to exist at a location such as an Internet merchant. For example, where the received request 4110 includes an address for an Internet merchant (e.g., Internet address), the service 4103 (e.g., a computing device thereof) may receive information by transmitting the request to the address along with one or more parameters associated with the item (e.g., a song, a movie, a game, a book, a good, etc.).

As an example, in the method 4100 of FIG. 17, results from making the decision 4132 may be instructive, for example, to determine if an item exists (e.g., for purposes of making the decision 4136). Such a process may include parsing at least a portion of results from a cache or an API (e.g., returned via an API call or calls). In such an example, if relevant metadata was returned then a method may include deciding to proceed under an assumption that a desired item exists. Further, where a cache or an API reply indicate that a desired item does not exist then a method may include deciding to proceed under an assumption that assumption desired item does not exist (e.g., at least as known to a system performing the method at that stage of the method).

As shown in the example of FIG. 17, if making the decision 4136 decides that the item does not exist, the service 4103 may transmit a query to the cache 4105 that may seek metadata stored in the cache 4105 as being one or more descriptors of the item (e.g., ID, artist, type of good, manufacturer, publisher, etc.). Such information may be from a prior link creation for the item (see, e.g. the example of FIG. 16), for example, as built by the service 4103 (e.g., a computing device thereof), for example, for a client of the service 4103 (e.g., for inclusion in a webpage of a website of the client for activation by one or more users).

As indicated in FIG. 17, such a query may optionally be part of a process that may be initiated with an aim to create a link (e.g., a URL, etc.) that can direct the user 4101 to a location (e.g., an Internet location) for purposes of reviewing, purchasing, consuming, etc. a desired item. In such an example, the cache 4105 may include metadata and, for example, not include a working link. Thus, to direct the user 4101, a process may be performed that aims to create a link based at least in part on metadata in the cache 4105. As an example, consider transmitting at least a portion of the metadata via a network interface to the Internet via a search application (e.g., a search engine). In response, the service 4103 (e.g., a computing device thereof) may receive information, optionally information as to the existence of the desired item (e.g., at the same Internet merchant, a different Internet merchant, in a catalog that may be a directory with merchant information, etc.).

As shown, the method 4100 includes making a decision 4138 that decides whether metadata has been cached (e.g., found in the cache 4105 responsive to the query). If making the decision 4138 decides that metadata is not cached (e.g., "no metadata"), then information associated with the prior created link may be used to initiate a search, for example, of at least one of the one or more databases 4109, which may optionally be via the Internet (e.g., an Internet search engine). In response to such a search, the service 4103 (e.g., a computing device thereof) may receive metadata pertaining to the desired item and then cache at least a portion of that metadata to the cache 4105.

Given results stemming from making of the decision 4138 where an item does not "exist" (e.g., a broken link is detected per making the decision 4136), the method 4100 may include performing a loop operation 4140, for example, until an acceptable (e.g., accepted) result is obtained that can aid in directing the user 4101 to a location.

As an example, the performed loop operation 4140 may perform a metadata-based search via transmission of a call or calls to the interface 4107 or, for example, one or more other interfaces (e.g., associated with one or more Internet merchants). Such a call or calls may return, for example, an item ID for a desired item. The performed loop operation 4140 may evaluate returned information with respect to one or more criteria, for example, optionally implementing a decay process, etc.

As shown in the example of FIG. 17, the method 4100 may, per making the decision 4136 (e.g., does not exist branch), perform a process 4150 that determines a best option for a destination of an item (e.g., an Internet address, etc.), that selects a determined best option and that transmits an update instruction for caching information as to the selected option (e.g., queue cache update). In such an example, where a subsequent request may be received, the cache 4105 may include information for directing a user (e.g., bypassing various decisions, etc. of the method 4100).

As an example, in the method 4100, a process or processes may occur at the time that a service is queuing an update to a cache. For example, the service may also provide relevant information back to a database (e.g., if a match of high enough degree was made based on one or more criteria). Such information may accompany original or other information and, for example, may be able to reduce time and processing. As an example, where such a match occurs of a high enough degree, the information may optionally be flagged, for example, for subsequent checking (e.g., as part of a quality assurance process, etc.).

The method 4100 includes transmitting a redirect 4160 from the service 4103 (e.g., a computing device thereof) to a user 4101 (e.g., a computing device thereof).

As illustrated in the example of FIG. 17, the method 4100 may transmit the redirect 4160 where making the decision 4132 decides that sufficient information is cached and/or where making the decision 4136 decides that a desired item as associated with the received request 4110 exists. Otherwise, the method 4100 may perform one or more processes that include, for example, making one or more API calls, performing an Internet search, etc. for purposes of constructing an acceptable (e.g., best option, etc.) redirect (e.g., link, URL, etc.) that may be transmitted from a computing device of the service 4103 to a computing device of the user 4101.

As an example, the method of FIG. 17 may be a "Link Usage" method. As an example, logic of such a method may be described as follows:

```
title Link Usage
User->Service: Request Link
Service->Cache: get "does item exist" 3rd party api result
    alt is cached
        Cache-->Service: yes/no
    else not cached
        Cache-->Service: sorry, no data found
    Service->3rd Party API: Does item exist
    3rd Party API-->Service: yes/no
        Service->Cache: cache it
    end
        alt Item exists
            Service->Service: Item Determined
        else Item doesn't exist
    Service->Cache: Get 3rd party metadata from link creation
        alt is cached
            Cache-->Service: metadata
        else not cached
            Cache-->Service: sorry, no metadata
        Service->Database: get metadata from link creation
            Database-->Service: metadata
            Service->Cache: cache it
        end
    loop until we get an accepted result (using decay logic)
        Service->3rd Party API: Search based on metadata
            3rd Party API-->Service: returns results
            Service->Service: Evaluates each result
        end
        Service->Service: Determine best option for destination item
        Service->Service: destination determined
        Service->Cache: queue update of cache
    end
Service-->User: Redirect to destination
```

As an example, if an item associated with a received request is determined to be unavailable in a specified storefront, a decay process may commence, which may formulate a redirect to a different storefront (e.g., another Internet merchant, advertiser, etc.). For example, if the band X completely removes their Y album, from the Z Internet merchant worldwide, a method may include performing a search using information as to X and/or Y and, based at least in part on results thereof, formulate a redirect to an Internet merchant other than Z. As an example, a system may include logic for formulating a redirect for a merchant other than that specified in a received request, for example, where a desired item (e.g., sought by a user that initiated the request) is not available via the merchant specified in the received request.

As an example, a process may include tiers of options: Exact Match (e.g., item ID is the same), Perfect Match (e.g., relevant metadata is exactly the same), Best Match (e.g., metadata is close enough), Decay (e.g., dropping a level of specificity), Search (e.g., creating a link, a search link, etc. from an original item's metadata). As an example, a system may include determining an option or options, for example, where one or more of the options may be taken in response to a determination that an item does not exist (e.g., in a country-based storefront in a country of a user, etc.).

As an example, various factors may aid in link resolution, link creation, etc. (e.g., for purposes of a redirect). For example: type of user device (e.g., laptop, tablet, phone, workstation, PC, watch, glasses, etc.); type of operating system (e.g., IOS/OSX®, CHROME®, WINDOWS®, etc.); type of application being executed (e.g., Angry Birds, Clash of Clans, etc.); time (e.g., hour, day, week, month, year, etc.); weather; translation result (e.g., exact, erroneous, etc.); type of good (e.g., physical, digital, service, etc.); manufacturer; brand (e.g., trademark, etc.); language; referrer (e.g., FACEBOOK®, TWITTER®, LINKEDIN®, etc.); number of prior clicks (e.g., for a specific device, user, group, association, etc.); click-based logic that accounts for prior click or clicks; geography (content, country, state, province, city, postal code, etc.); affiliate program(s); partners; etc.

As an example, consider time zones; urban versus rural; hills, mountains, water locations; user travel (e.g., outside of a region where the user may be normally found, residing, etc.); type of wireless connection (e.g., 4G, 3G, WiFi, etc.); type of network connection (e.g., DSL, broadband, GOOGLE FIBER, etc.); network connectivity (e.g., user connection drops and cannot complete a process, a service issue, a storefront issue, etc.); identifying a specific user (e.g., know that person X prefers shopping on Amazon storefront while person Y prefers shopping on iTunes storefront, etc.); age of user; age of device; gender of user; demographic/psychographic information about a user; etc.

As to identifying a specific device of a user, for example, a service may have information that indicates that device X has had no conversions for Amazon storefront clicks while device Y has converted on clicks to sales inside an iTunes store. A decision may be made based on knowing versus not knowing anything about a user device (e.g., per information, etc.).

As an example, a click share method may credit clicks to a service where they are at a level of, for example, best match or lower (e.g., per a decay algorithm).

As an example, where a provided link may be valid (e.g., operable) for a period of time (e.g., for any of a variety of reasons), an evergreen process may act to maintain information such that a "valid" link may be established even after that provided link becomes invalid (e.g., inoperable). In the example of FIG. 16, metadata may be returned in response to a request (e.g., an initial request). As an example, an API call may result in return of metadata, a search may result in return of metadata, a lookup in organized data (e.g., a database) may result in return of metadata, a scrape of a website may return metadata, etc. As an example, a copyright database may provide metadata (e.g., US Library of Congress database), a publisher database may provide metadata (e.g., a music publisher), an iTunes® database may provide metadata, an Amazon® database may provide metadata, etc.

As an example, where a client submits a create link request to a service for providing an "evergreen" link, the service may use information provided by the client (e.g., a link or other information) to access metadata, to construct "short" code (e.g., via short URI generator) that is associated with at least a portion of the accessed metadata and return an evergreen link to the client (e.g., short URI, etc.). As an example, a URI may be classified as a locator (URL), as a name (URN), or as both. As an example, TinyURL/Bit.ly is a URL shortening service (e.g., a short code generator) that can provide short aliases for redirection of long URLs (e.g., where for each URL entered, a server can add a new alias in a database (e.g., optionally hashed) and returns a short URL).

As an example, a client may then use the short link for advertising, providing access to a resource, etc. For example, a client may have a long link from a merchant (e.g., Amazon® merchant, iTunes® merchant, etc.) and desire to be able to allow users to access a product from that merchant where that merchant may change its long link. In such an example, the service may be an intermediary, as it may provide a link tied to metadata (e.g., which may be short link). Upon a user clicking the link (e.g., as provided by the client), the service may handle the link.

As an example, an evergreen process may operate on a link that is known to be valid for a specified good or service, access metadata for the specified good or service and generate a new link that is associated with at least a portion of that metadata. In such a scenario, where the link that was known to be valid is no longer valid, the generated link may access the at least a portion of the metadata to direct a user to the appropriate, originally specified good or service. For example, where iTunes® sells a song that can be accessed for purchase via an iTunes® link, if that link changes, a user is unlikely to reach that song. However, where metadata has been stored or is otherwise associated with a generated link, when a user clicks that generated link, the metadata (e.g., at least a portion thereof) may be used to identify a proper link for that user such that the user may reach that song. As an example, where a catalog number has changed for the song in the iTunes® catalog, the user may be directed to that song (e.g., identifying it via metadata where the metadata allows for finding the song as associated with the new catalog number, link, etc.). As an example, where an API call to a merchant interface using stored metadata fails to provide a match, an alternative may be provided for the user. For example, consider a search (e.g., using a Google® search engine).

As an example, a database may include a merchant link for a good or service, metadata for that good or service and a generated link. In such an example, where a user clicks on the generated link, if the merchant link is inoperable, a method may access the metadata and then direct the user to the merchant, for example, specifically to the good or service; alternatively, a method may access the metadata and then direct the user to another merchant or another resource to assist the user in a purchasing decision or actual purchasing. As an example, an evergreen process may be part of another process, method, etc., for example, for geolocation, assessing splits, assessing credits, etc.

As an example, if a new long link is found, that link may be used to update information in a database. For example, if the metadata returns a new link from the same merchant, that may be stored.

As an example, consider a playlist that includes a plurality of links associated with a merchant. Where the playlist is, for example, for classical music, 50s jazz, 60s rock-n-roll, etc., and expected to be "fixed", a change in one or more of the links may confound the playlist, advertising of the playlist, "liner" notes, history, etc. If the playlist is to create a "mood", one or more inoperable links may lead to one or more missing songs that may characterize that mood. For example, consider a Bossa Nova playlist where a link to the song "the Girl from Ipanema" is inoperable, users may be disappointed, which may reflect poorly on a sponsor of the playlist. As an example, an evergreen process may provide generated links that can help ensure that a playlist maintains its integrity. Further, as an example, a tiered approach may be implemented to substitute a song where the original song of the playlist is no longer available (e.g., or available under different terms, unfavorable terms, etc.).

Major e-tailers like iTunes® and Amazon® often create unique, localized storefronts for the countries they do business in. For example, iTunes® and the App Store have 155 different international storefronts. So when a visitor from Australia clicks a link to a tune on your website hosted in, let's say, Germany, he or she is automatically sent to the storefront for Australia.

Issues may arise as each country storefront may have distinct product IDs for various items in its library. For example, a product ID for Australia may not match the one your link references for Germany. If not, the Australian visitor may be presented with an error message rather than the product he or she was looking to buy. Such an issue may be referred to as "geo-fragmentation" (e.g., where a shopper can't buy through your link and, for example, where you don't get credit for referrals).

As an example, a service (e.g., operable via a computing system, etc.) may translate a link to ensure it references the correct product ID in the international visitor's storefront. By enabling him or her to buy the digital product, such an engine may help ensure appropriate credit for commissions on subsequent purchases.

As an example, a service may allow international visitors who click your link (on a website, in a social post, through an app, or ad) to be sent to the right product in the right store, rather than an error message; visitors may buy the product, and you get credit for the sales you generate for the e-tailer; links may be effectively "updated", for example, even if an e-tailer changes the ID on its end; a single dashboard may consolidate reporting across all products, platforms and affiliate programs in a system for the service, for example, to ease account management.

As an example, a system can include circuitry that processes a URL for information; circuitry that transmits at least a portion of the information via a network interface; circuitry that receives metadata via the network interface responsive to the transmission of at least a portion of the information; circuitry that associates at least a portion of the metadata with a short URL; and circuitry that transmits the short URL. In such an example, the URL may include Internet merchant information. As an example, circuitry that transmits at least a portion of information may transmit an API call. For example, consider an API call that corresponds to an API specification of an Internet merchant. As an example, information may be a product ID. For example, circuitry that transmits may transmit a product ID as a parameter in an API call (e.g., consider an API call that corresponds to an API specification of an Internet merchant, etc.).

As an example, a system may include circuitry that processes a URL for information at least in part by parsing the URL for a product ID.

As an example, a system may include circuitry that requests a short URL. As an example, a system may include circuitry that receives a short URL responsive to a request for a short URL.

As an example, a system can include an interface that receives a URL associated with an entity; circuitry that processes the URL for Internet merchant information; circuitry that transmits information via a network interface where the information is based at least in part on the Internet merchant information; circuitry that receives metadata via the network interface based at least in part on transmission of the information; circuitry that detects URL faults; circuitry that formulates a redirection URL based at least in part on entity information associated with the entity and based at least in part on the received metadata; and circuitry that implements the redirection URL based at least in part on detection of a fault associated with the URL. In such an example, the circuitry that implements the redirection URL may transmit the redirection URL to the entity based at least in part on the entity information.

As an example, metadata may include metadata that describes an item listed by at least one Internet merchant. As an example, a system may include circuitry that detects URL faults, for example, that detects whether a URL is broken (e.g., per an error code, etc.). As an example, a system As an example, a system can include circuitry that transmits a request for an item identification code based at least in part on the received metadata. In such an example, circuitry that formulates a redirection URL may formulate the redirection URL based at least in part on the item identification code.

As an example, a system can include circuitry that stores metadata to a database. As an example, such a system may include the database. As an example, a database may include a URL field for an item, a metadata field for the item and a short URL field for the item.

As an example, a method may include receiving a short link request associated with a good or service; attempting to access a website for purchase of the good or service via a stored long link, the long link being associated with the short link in a database; and responsive to a failed attempt, accessing stored metadata for the good or service, the metadata being associated with the short link in the database and identifying another long link for purchase of the good or service. In such an example, the method may include building the short link based at least in part on the long link prior to receiving the short link.

Instructions for performing operations described herein may optionally be stored in a computer (e.g. a computer, a phone, a tablet, etc., with circuitry such as a processor) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus. A computer-readable medium can include any mechanism for storing information in a form readable by a machine (e.g., a computer).

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
a processor-based circuitry of at least one of one or more servers that processes a website URL for a client of a redirection service for information wherein the website URL comprises product information;
a processor-based circuitry of at least one of the one or more servers that receives product metadata at least in part via a scrape of content of a website of the website URL;
a processor-based circuitry of at least one of the one or more servers that generates a redirection URL based at least in part on information associated with the client of the redirection service;
a processor-based circuitry of at least one of the one or more servers that generates an association of at least a portion of the product metadata with the redirection URL and that stores the association and the at least a portion of the product metadata in a database;
a network interface circuitry operatively coupled to at least one of the one or more servers that transmits the generated redirection URL to the client of the redirection service;
a network interface circuitry operatively coupled to at least one of the one or more servers that receives the redirection URL responsive to a user activating, via an application, an Internet link of the client of the redirection service;
a processor-based circuitry of at least one of the one or more servers that determines whether the received redirection URL is faulty;
a processor-based circuitry of at least one of the one or more servers that, via the stored association, accesses at least a portion of the stored product metadata in response to the received redirection URL being faulty and that builds a different redirection URL based at least in part on at least a portion of the accessed stored product metadata and based at least in part on the information associated with the client of the redirection service; and
a network interface circuitry operatively coupled to at least one of the one or more servers that transmits the built, different redirection URL to the client of the redirection service.

2. A system comprising:
an interface of at least one of one or more computing devices that receives a URL associated with an entity wherein the URL corresponds to a website for a product;
a processor-based circuitry of at least one of the one or more computing devices that receives metadata for the product at least in part via a scrape of content of the website;
a processor-based circuitry of at least one of the one or more computing devices that builds a redirection URL based at least in part on the URL;
a processor-based circuitry of at least one of the one or more computing devices that generates an association of at least a portion of the product metadata with the redirection URL and that stores the association and the at least a portion of the product metadata in a database;
a network interface circuitry of at least one of the one or more computing devices that transmits the redirection URL for use by the entity;
a network interface circuitry of at least one of the one or more computing devices that receives the redirection URL responsive to a user activating, via an application, an Internet link associated with the entity;
a processor-based circuitry of at least one of the one or more computing devices that detects URL faults;
a processor-based circuitry of at least one of the one or more computing devices that formulates a different redirection URL based at least in part on entity information associated with the entity and based at least in part on at least a portion of the stored metadata; and
a processor-based circuitry of at least one of the one or more computing devices that implements the different redirection URL based at least in part on detection of a fault associated with the received redirection URL.

3. The system of claim 2 wherein the processor-based circuitry of at least one of the one or more computing devices that implements the different redirection URL transmits the different redirection URL to the entity based at least in part on the entity information.

4. The system of claim 2 wherein the metadata comprises metadata that describes the product as listed by at least one Internet merchant.

5. The system of claim 2 wherein the processor-based circuitry of at least one of the one or more computing devices that detects URL faults detects whether a URL is broken.

6. The system of claim 2 further comprising network interface circuitry of at least one of the one or more computing devices that transmits a request for an identification code for the product based at least in part on the received metadata.

7. The system of claim 6 wherein the processor-based circuitry of at least one of the one or more computing devices that formulates the different redirection URL formulates the different redirection URL based at least in part on the identification code.

8. The system of claim 2 wherein the system comprises the database.

9. The system of claim 2 wherein the database comprises a data structure that comprises a URL field for the product, a metadata field for the product and a short URL field for the product.

10. A method comprising:
  receiving a long link via a network interface of at least one of one or more computing devices that comprises information associated with a good or service;
  via at least one of the one or more computing devices, scraping content of a website for metadata associated with the good or service;
  via at least one of the one or more computing devices, building a short link based at least in part on the long link, generating an association for the short link with at least a portion of the metadata, and storing the association and the at least a portion of the metadata in a database; and
  via at least one of the one or more computing devices, transmitting the short link to a client of a redirection service;
  via a network interface of at least one of the one or more computing devices, receiving the short link responsive to a user activating, via an application, an Internet link associated with the client;
  via at least one of the one or more computing devices, determining whether the received short link is faulty;
  via at least one of the one or more computing devices, accessing at least a portion of the metadata in response to the received short link being faulty and building a different link based at least in part on at least a portion of the accessed stored metadata and based at least in part on information associated with the client of the redirection service; and
  via a network interface of at least one of the one or more computing devices, transmitting the different link to the client of the redirection service.

* * * * *